United States Patent
Yamaguchi

(10) Patent No.: US 8,702,097 B2
(45) Date of Patent: Apr. 22, 2014

(54) IMAGE FORMING APPARATUS AND BELT UNIT

(75) Inventor: Wataru Yamaguchi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 472 days.

(21) Appl. No.: 12/724,933

(22) Filed: Mar. 16, 2010

(65) Prior Publication Data

US 2011/0049795 A1 Mar. 3, 2011

(30) Foreign Application Priority Data

Sep. 2, 2009 (JP) ................................. 2009-202582

(51) Int. Cl.
*B65H 5/02* (2006.01)

(52) U.S. Cl.
USPC ............................ 271/275; 198/806; 271/198

(58) Field of Classification Search
USPC .................. 271/264, 198, 275; 198/806, 807, 198/810.03, 814; 399/302, 303, 308
See application file for complete search history.

(56) References Cited

U.S. PATENT DOCUMENTS

| | | | |
|---|---|---|---|
| 5,991,575 A | 11/1999 | Okiyama et al. | |
| 6,195,518 B1 | 2/2001 | Bennett et al. | |
| 7,434,680 B2 * | 10/2008 | Kitamura | 198/806 |
| 7,565,095 B2 * | 7/2009 | Mori | 399/165 |
| 2002/0046932 A1 | 4/2002 | Wakana | |
| 2006/0119029 A1 * | 6/2006 | Kitamura | 271/275 |
| 2007/0029717 A1 * | 2/2007 | Mori | 271/8.1 |
| 2007/0272512 A1 * | 11/2007 | Maki | 198/339.1 |
| 2008/0181682 A1 * | 7/2008 | Pang | 399/302 |
| 2009/0202275 A1 | 8/2009 | Nishida et al. | |

FOREIGN PATENT DOCUMENTS

| | | |
|---|---|---|
| EP | 0974876 A1 | 1/2000 |
| JP | 04-179648 | 6/1992 |
| JP | 04-272042 | 9/1992 |
| JP | 04-317936 | 11/1992 |
| JP | 11-065336 A | 3/1999 |
| JP | 2002-023518 | 1/2002 |

(Continued)

OTHER PUBLICATIONS

Extended EP Search Report dtd Mar. 18, 2011, EP Appln.10002752.3.

(Continued)

*Primary Examiner* — Thomas Morrison
(74) *Attorney, Agent, or Firm* — Banner & Witcoff, Ltd.

(57) ABSTRACT

An image forming apparatus and a belt unit are provided. The image forming apparatus or the belt unit includes: an endless belt; a driving roller; a driven roller; a tension generating member which generates a tension at the belt; a displacement member which is provided to be displaced in a displacement direction parallel to the axial direction of the driven roller together with the belt when the belt is moved in a moving direction along the displacement direction; and an axial force converting unit which converts a force of displacing the displacement member into a force which is directed in a direction intersecting the displacement direction and causes the tension generated at the belt to change such that a ratio of a tension generated on a trailing side in the moving direction of the belt to a tension generated on a leading side in the moving direction is decreased.

15 Claims, 16 Drawing Sheets

(56) References Cited

FOREIGN PATENT DOCUMENTS

| | | |
|---|---|---|
| JP | 2002-220107 A | 8/2002 |
| JP | 2005-343577 | 12/2005 |
| JP | 2006162659 | 6/2006 |
| JP | 2007-223783 | 9/2007 |
| JP | 2009-186910 A | 8/2009 |
| JP | 2010-230958 A | 10/2010 |

OTHER PUBLICATIONS

CN Office Action dated May 28, 2012, in corresponding Application No. 201010143501.7, English Translation.

JP Decision of Patent Grant dated Dec. 20, 2011, in corresponding Application No. 2009202582; English Translation.

JP Office Action dated Aug. 2, 2011, corresponding JP Application No. 2009-202582. English Translation.

* cited by examiner

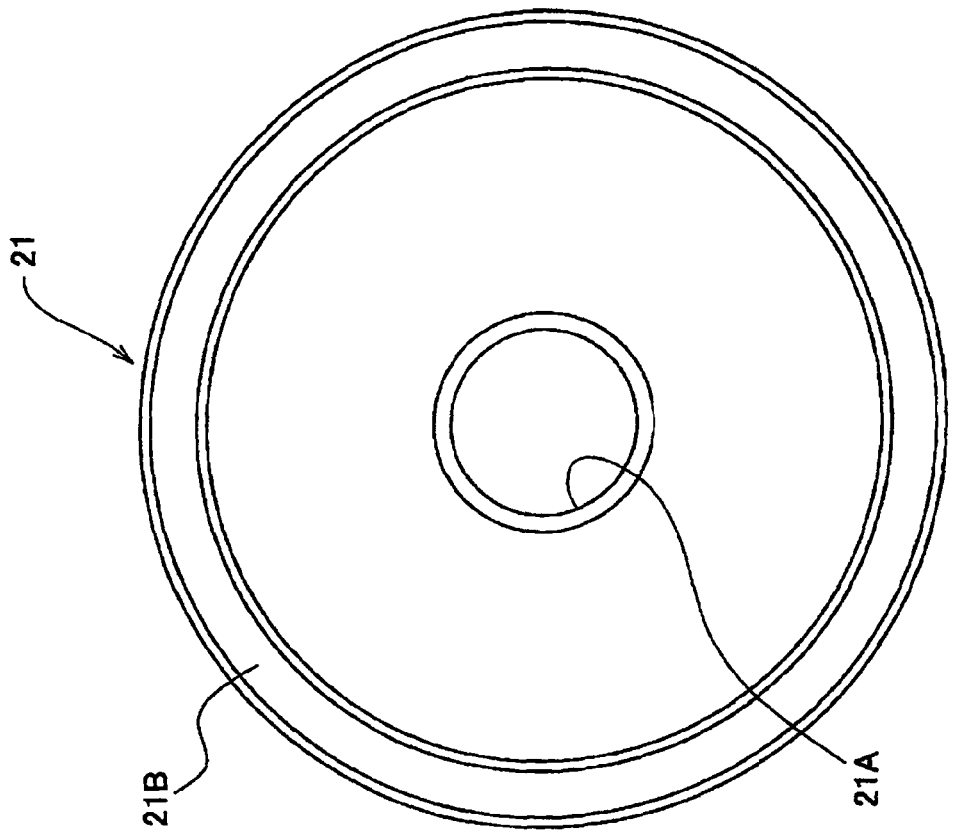
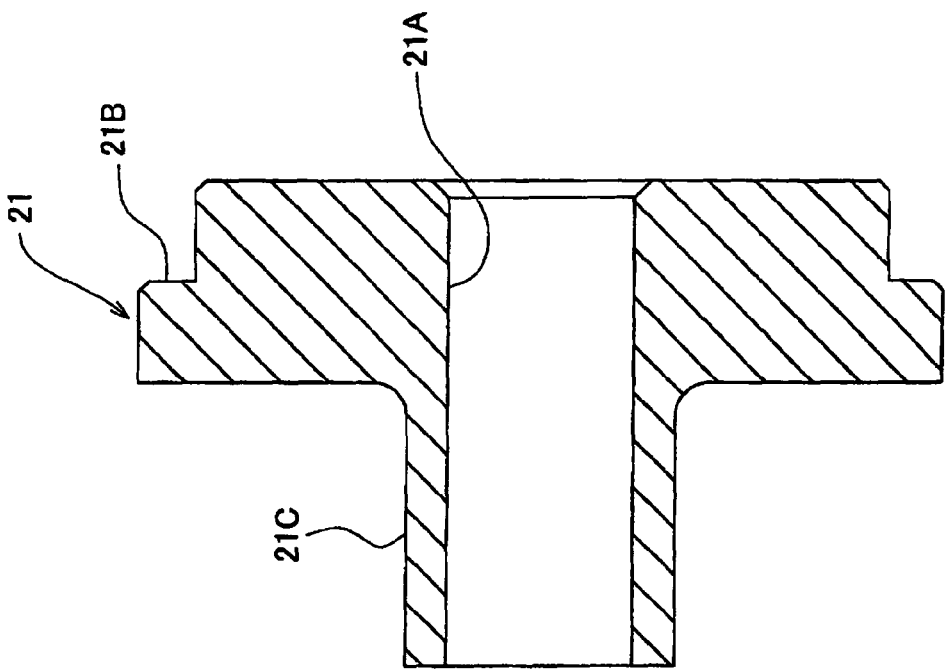

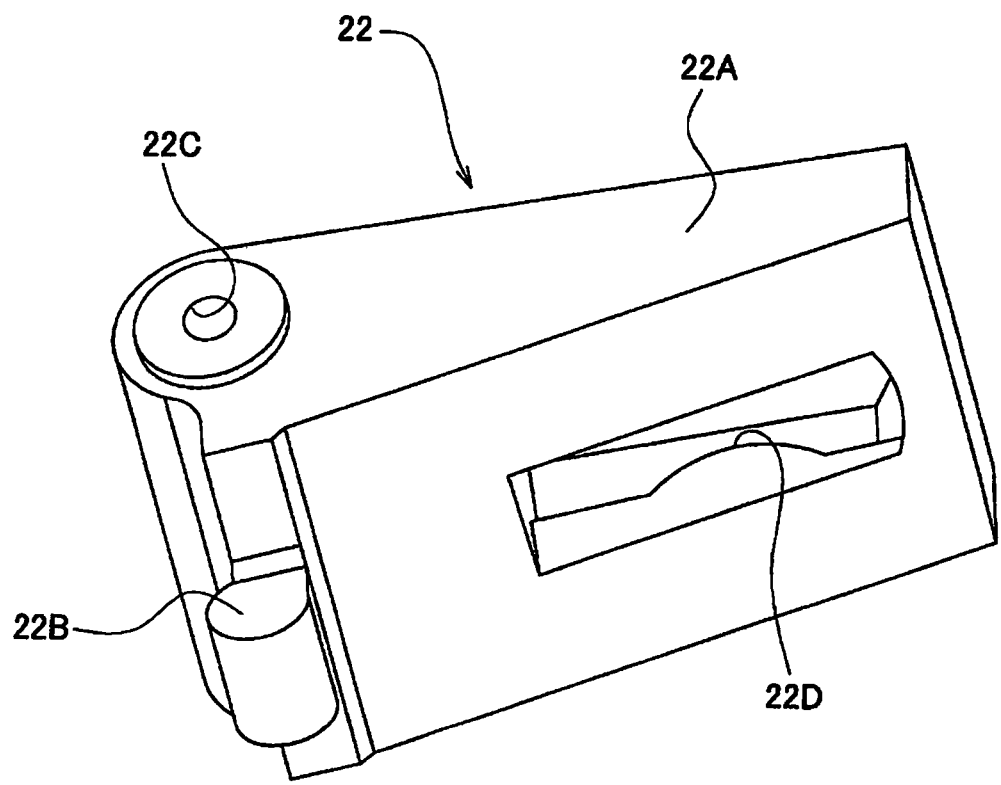

IMAGE FORMING APPARATUS AND BELT UNIT

CROSS-REFERENCE TO RELATED APPLICATION

This application claims priority from Japanese Patent Application No. 2009-202582, filed on Sep. 2, 2009, the entire subject matter of which is incorporated herein by reference.

TECHNICAL FIELD

Aspects of the present invention relate to an image forming apparatus and a belt unit.

BACKGROUND

A belt unit includes an endless transfer belt, a driving roller that rotationally drives the belt, and a driven roller that is rotationally driven with the rotation of the transfer belt looped between the driving roller and the driven roller.

However, if a tension applied to the belt is not uniform in a width direction or if deviations in dimensions or assembly dimensions of the respective rollers are large, the belt skews, so that the belt moves in the width direction while being rotated. Herein, the width direction means a direction that is orthogonal to a rotation direction and is orthogonal to a thickness direction of the belt, and corresponds to an axial direction of the roller in general.

Further, if the belt largely skews, the end portion of the belt in the width direction interferes with other members, so that it is concerted that the end portion of the belt in the width direction is damaged.

Accordingly, for example, in a related-art technique, the skew of the belt is suppressed by displacing the rotating shaft of the driven roller in an upper-lower direction, which is a direction orthogonal to an extension surface of the belt, according to the skew of the belt. Herein, the extension surface means a portion of the belt, which is extended in a flat surface shape by the application of a tension. In general, the extension surface means a flat surface portion of the belt that is formed between the driving roller and the driven roller.

SUMMARY

However, when the rotating shaft of the driven roller is displaced in the upper-lower direction, the extension surface of the belt is also displaced in the upper-lower direction with the displacement of the rotating shaft. Therefore, a distance (clearance) between the extension surface and a member that is provided to oppose the extension surface is changed. Accordingly, a negative influence may occur in an image formation or the like.

That is, for example, in an intermediate transfer type image forming apparatus, an image is transferred to (formed on) the extension surface of the belt (intermediate transfer belt) before the image is transferred on a sheet. If the rotating shaft of the driven roller is displaced in the upper-lower direction in order to suppress the skew of the belt, a distance between the extension surface and a developing unit that forms an image on the belt is changed. Accordingly, a negative influence may occur in an image formation.

Further, for example, in a direct transfer type image forming apparatus, an image is not formed on the belt and is directly formed on a sheet conveyed on the belt. If the rotating shaft of the driven roller is displaced in the upper-lower direction in order to suppress the skew of the belt, not only a distance between the sheet (belt) and a photosensitive drum that carries the image to be transferred to the sheet conveyed on the belt, but also a distance between the belt and a transfer member that is provide on the side of the belt opposite to the photosensitive drum are changed. Accordingly, a negative influence may occur in an image formation.

Furthermore, for example, the above-described image forming apparatus may include a belt cleaner for removing materials adhering to the belt, a developer remaining on the belt, and the like. If the rotating shaft of the driven roller is displaced in the upper-lower direction in order to suppress the skew of the belt, a distance between the belt cleaner and the belt is changed, so that the removing performance of the belt cleaner deteriorates. Accordingly, it is highly concerned that a negative influence occurs in an image formation due to the deterioration of the removing performance of the belt cleaner.

As described above, in a belt unit used for an image forming apparatus, it is highly concerned that displacing the rotating shaft of the driven roller in the upper-lower direction in accordance with the skew of the belt has a negative influence on an image formation. Accordingly, it seems not appropriate to displace the rotating shaft of the driven roller in the upper-lower direction.

Accordingly, an aspect of the present invention provides a belt unit and an image forming apparatus that stabilizes a rotational path of a belt by suppressing the skew of the belt while reducing a negative influence on an image formation.

According to an illustrative embodiment of the present invention, there is provided an image forming apparatus configured to form an image on a sheet. The image forming apparatus comprises: an endless belt; a driving roller which is configured to rotationally drive the belt; a driven roller which is configured to be rotationally driven with the rotation of the belt; a frame which supports the driving roller and the driven roller; a tension generating member which is configured to generate an urging force to generate a tension at the belt; a displacement member which is provided to be displacable in a displacement direction parallel to an axial direction of the driven roller, and which is displaced in the displacement direction together with the belt when the belt is moved in a moving direction along the displacement direction during the rotation of the belt; and an axial force converting unit which is configured to convert a force of displacing the displacement member into a force which is directed in a direction intersecting the displacement direction and causes the tension generated at the belt to change such that a ratio of a tension generated on a trailing side in the moving direction of the belt to a tension generated on a leading side in the moving direction of the belt is decreased.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 7A is a cross-sectional view of a belt collar according to the first illustrative embodiment of the preset invention;

FIG. 7B is a view of the belt collar according to the first illustrative embodiment of the present invention when seen from a driven roller;

FIG. 8 is a perspective view of a lever arm according to the first illustrative embodiment of the present invention;

DETAILED DESCRIPTION

Illustrative embodiments of the preset invention will be described with reference to drawings. In the following description, a belt unit and an image forming apparatus according to illustrative embodiments are employed in an electrophotographic image forming apparatus.

First Illustrative Embodiment

1. Overall Configuration of Image Forming Apparatus

Figure 1:
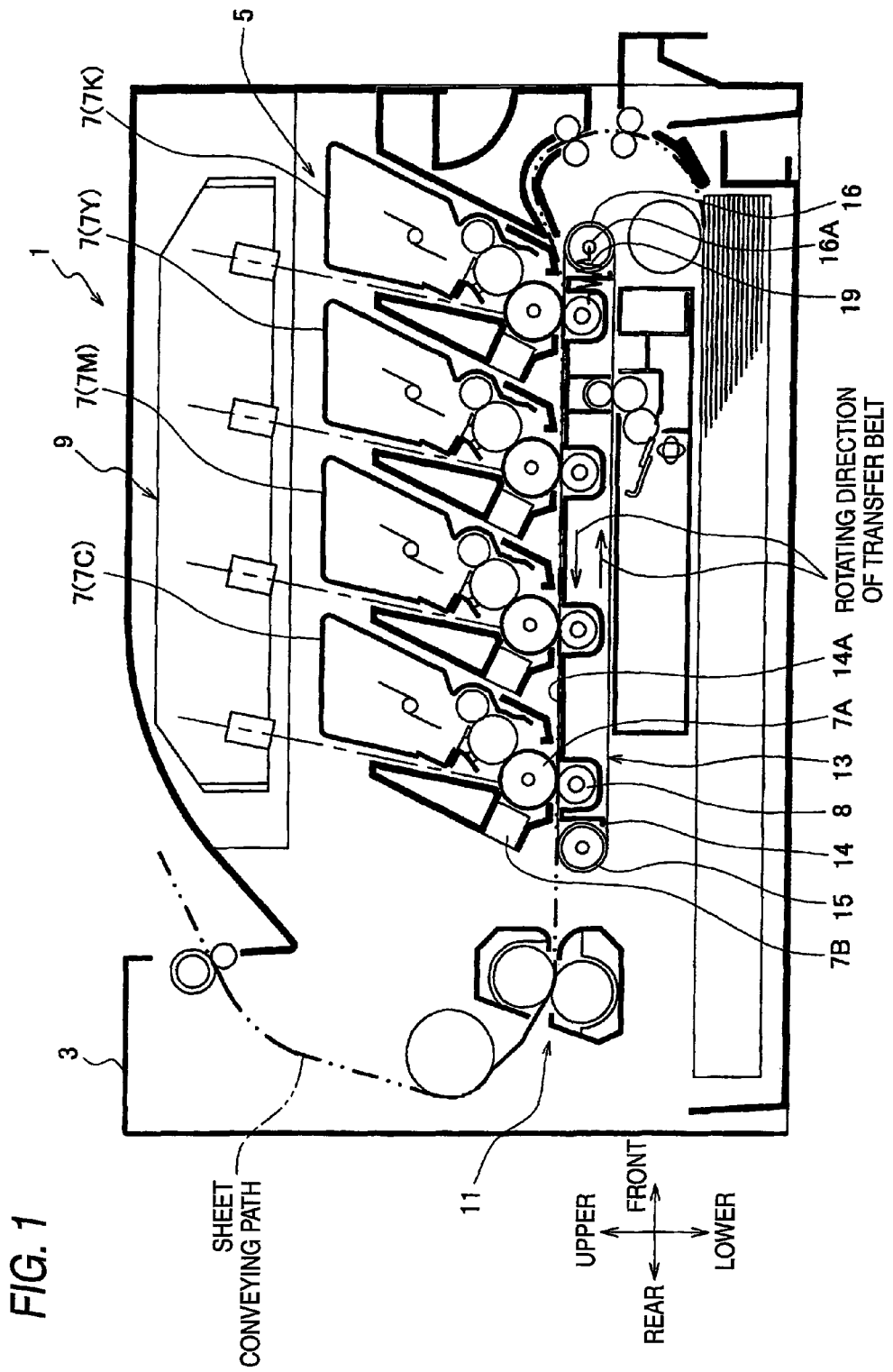
FIG. 1 is a center cross-sectional view of an image forming apparatus according to an illustrative embodiment of the present invention.

As shown in FIG. 1, an image forming apparatus 1 includes a housing 3, and an electrophotographic image forming section 5 which is provided in the housing 3 and which forms an image on a sheet by transferring developer images to a recording sheet (hereinafter, referred to as a sheet) such as recording paper or an OHP sheet. The image forming section 5 includes process cartridges 7, transfer rollers 8, an exposure unit 9, a fixing device 11, and the like.

The image forming section 5 according to the first illustrative embodiment is a direct tandem color type. The image forming section includes a process cartridge 7K for black, a process cartridge 7Y for yellow, a process cartridge 7M for magenta, and a process cartridge 7C for cyan which are sequentially provided in series from an upstream side in a sheet conveying direction (rotating direction of a belt to be described later).

Each of the process cartridges 7K, 7Y, 7M and 7C includes a photosensitive drum 7A which carries a developer image thereon, and a charger 7B which charges the photosensitive drum 7A with electricity. In FIG. 1, the reference numerals 7A and 7B are given to the photosensitive drum and the charger for only the process cartridge 7C for cyan.

In the above-described configuration, after an electrostatic latent image is formed on an outer peripheral surface of the photosensitive drum 7A by exposing the charged photosensitive drum 7A with the exposure unit 9, when charged developer (powdery toner in the first illustrative embodiment) is supplied to the photosensitive drum 7A, a developer image is formed (carried) on the outer peripheral surface of the photosensitive drum 7A.

A transfer roller 8 is provided so as to oppose the photosensitive drum 7A with a transfer belt 14 interposed therebetween. The transfer roller 8 transfers the developer image carried on the photosensitive drum 7A to a sheet conveyed by the transfer belt 14. The sheet on which the developer image has been transferred is conveyed to the fixing device 11 and heated, and the developer image transferred to the sheet is fixed (fused) to the sheet.

2. Belt Unit 2.1. Overall Configuration of Belt Unit

Figure 2:
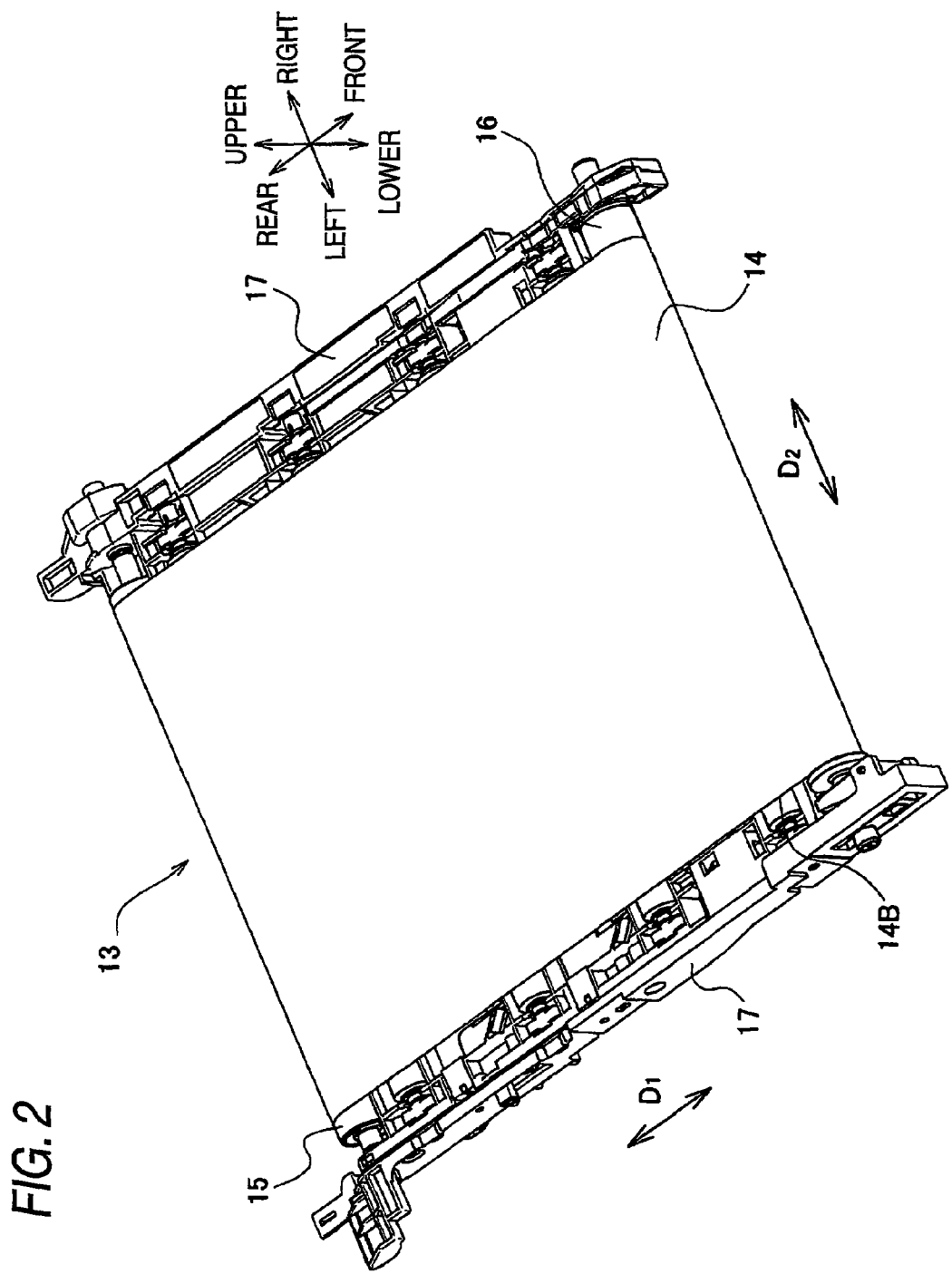
FIG. 2 is a perspective view of a belt unit according to a first illustrative embodiment of the present invention.

As shown in FIG. 2, a belt unit 13 includes a transfer belt 14, a driving roller 15, a driven roller 16, and a pair of frames 17 which hold (support) the driving roller 15 and the driven roller 16 at both ends thereof in an axial direction of each driving roller 15 and driven roller 16. The belt unit 13 is removably mounted in a main body of the apparatus.

Further, the transfer belt 14 is an endless belt member which is made of resin material (thermoplastic elastomer in the first illustrative embodiment), and is looped between the driving and rollers 15 and 16 (see FIG. 1). In the first illustrative embodiment, a portion, which opposes the process cartridge 7 (photosensitive drum 7A), of a flat portion of the transfer belt 14, which is formed between the driving roller 15 and the driven roller 16, is referred to as an extension surface 14A (see FIG. 1).

The driving roller 15 is rotatably supported by the frames 17 so that a position of the driving roller is fixed to the frames 17. The driving roller is rotated by a force supplied from a driving source such as an electric motor (not shown) provided in the main body of the apparatus, thereby rotating the transfer belt 14. When the transfer belt 14 is rotated by the rotation of the driving roller 15, the driven roller 16 is rotationally driven with the rotation of the transfer belt 14.

The driven roller 16 is provided substantially in parallel with the driving roller 15. A rotating shaft 16A (see FIG. 1) of the driven roller 16 is supported by the frames 17 to be displacable in a direction which is parallel to a direction of a tension (a front-rear direction of the image forming apparatus 1 in the first illustrative embodiment) generated at the extension surface 14A and which is orthogonal to the axial direction of the rotating shaft 16A of the driven roller 16 (hereinafter, this direction is referred to as an "axial direction D2" (see FIG. 2)).

Figure 4:
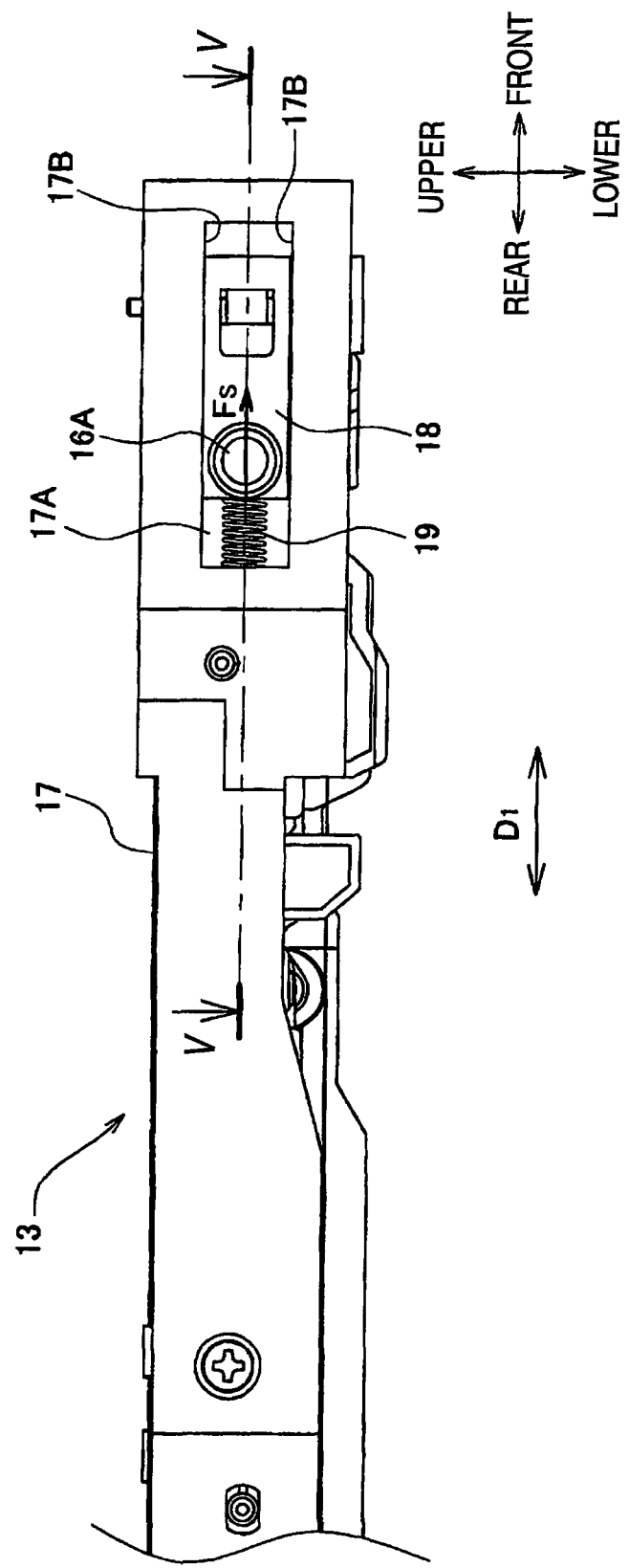
FIG. 4 is a side view of the belt unit according to the first illustrative embodiment of the present invention.

That is, as shown in FIG. 2, the pair of frames 17 are provided so as to sandwich the transfer belt 14 from both sides thereof in the axial direction D2, and extends in a direction parallel to the direction of the tension generated at the extension surface 14A (hereinafter, referred to as an extension direction D1). Further, as shown in FIG. 4, each of the frames 17 is formed with a rectangular long hole 17A having a longitudinal direction (long-side direction) corresponding to the extension direction D1. The rectangular long hole 17A is provided at an end portion of the farm in the longitudinal direction where the driven roller 16 is provided.

Further, in the long hole 17A, a bearing block 18 which rotatably supports the rotating shaft 16A is provided to be displacable. The long hole 17A includes a pair of inner wall surfaces 17B which extend in parallel with the extension direction D1 and regulate the displacement direction of the bearing block 18. Accordingly, the bearing block 18, that is, the driven roller 16 is displacable only in a direction parallel to the extension direction D1.

Each of the bearing blocks 18 receives an elastic force Fs which is parallel to the extension direction D1 and causes a distance between the axis of the driven roller 16 and the driving roller 15 to increase, from a coil spring 19. Accordingly, in the first illustrative embodiment, the driven roller 16 functions as a tension roller which generates a predetermined tension at the extension surface 14A (transfer belt 14), so that the transfer belt 14 is rotated together with the driving roller without slipping on the driving roller 15 by a frictional force which is generated at a contact portion between the transfer belt 14 and the driving roller 15.

In the first illustrative embodiment, the direction of the elastic force Fs of the coil spring 19 is parallel to the extension direction D1. Accordingly, most of the elastic force Fs of the coil spring 19 is applied to the driven roller 16 through the bearing block 18 as an urging force which generates a tension at the transfer belt 14 (extension surface 14A).

Figure 5:
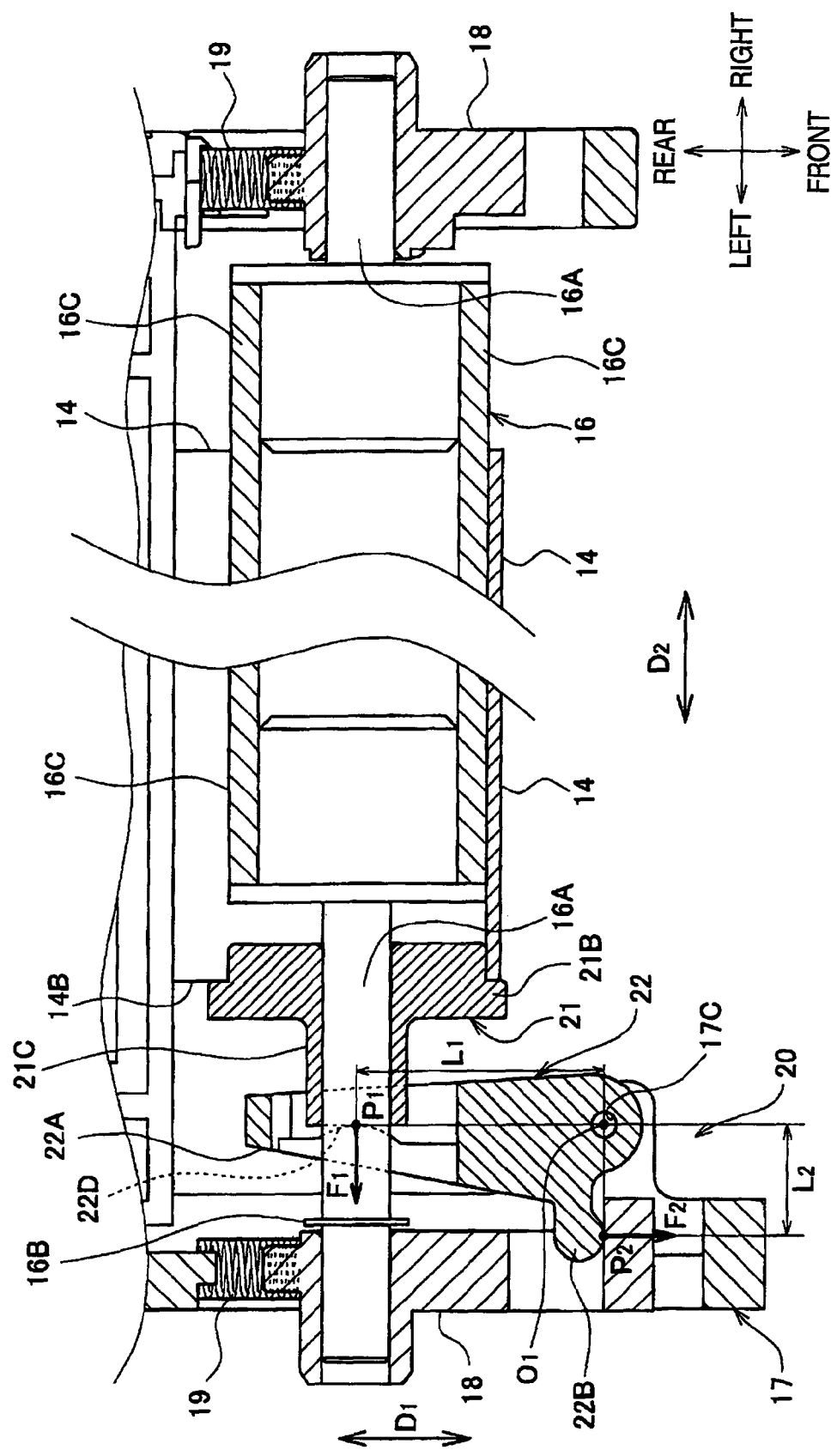
FIG. 5 is a cross-sectional view taken along a line V-V of FIG. 4.

As shown in FIG. 5, the driven roller 16 includes a cylindrical roller main body 16C which is made of light metal such as aluminum, and a rotating shaft 16A which is press-fitted to the roller main body 16C so as to close both ends of the roller main body 16C in an axial direction and is made of high rigidity metal such as steel.

Further, the bearing block 18 is brought into sliding contact with a snap ring 16B such as an E-snap ring mounted on the rotating shaft 16A, so that one end of the driven roller 16 in the axial direction (facing a skew force damping mechanism 20) is positioned. The bearing block 18 is brought into sliding contact with a large-diameter portion of the rotating shaft 16A (a portion press-fitted to the roller main body 16C), so that the other end of the driven roller in the axial direction is positioned.

2.2. Overall Configuration of Skew Force Damping Mechanism

For example, if the tension generated at the transfer belt 14 is not uniform in the axial direction D2 due to the fact that the urging force (elastic force) of the coil spring 19 at one end of the driven roller in the axial direction D2 is different from that at the other end of the driven roller in the axial direction D2, the transfer belt 14 skews so as to move in the axial direction D2 while being rotated.

Figure 3:
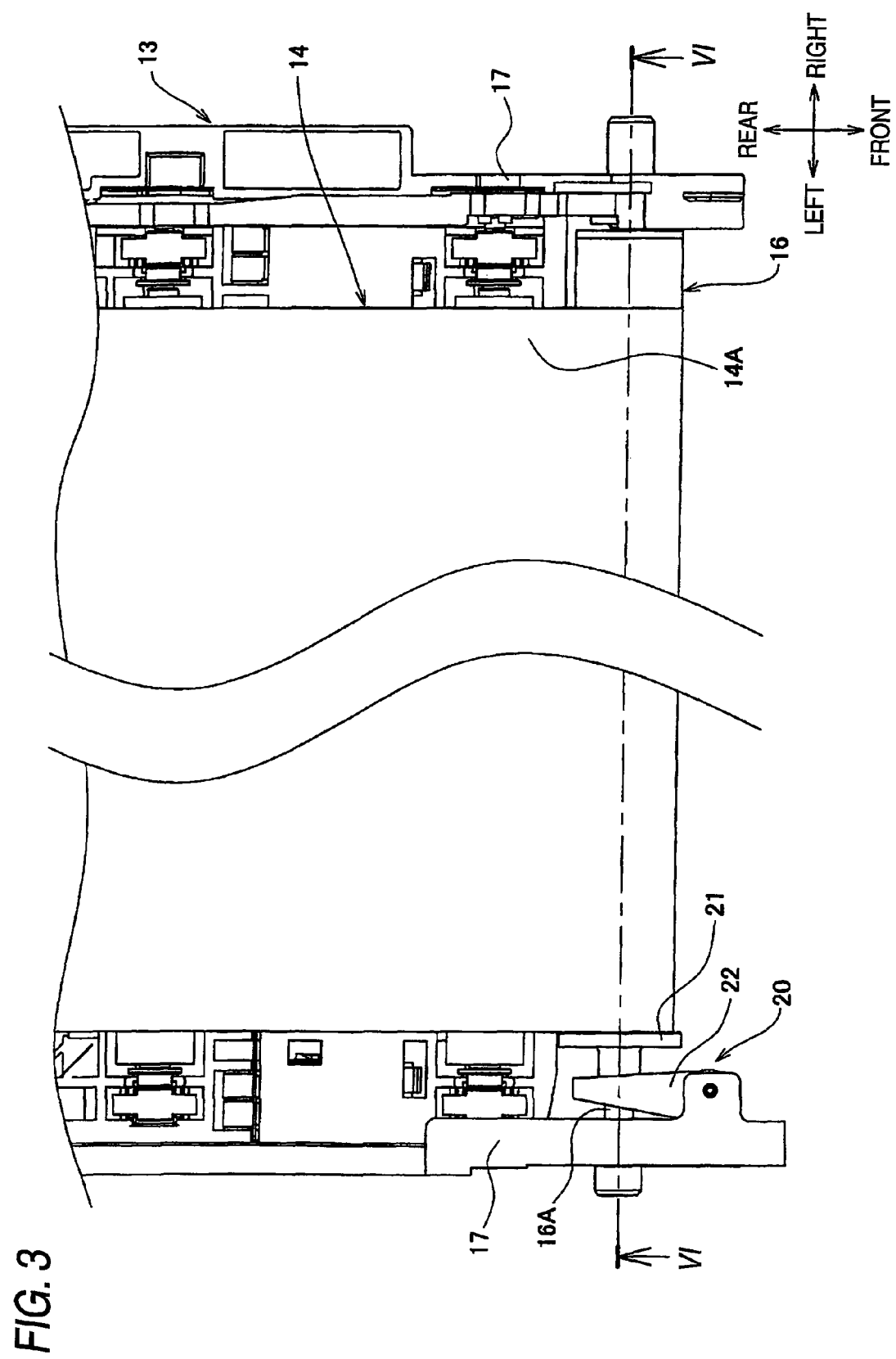
FIG. 3 is a top view of the belt unit according to the first illustrative embodiment of the present invention.

Accordingly, in the first illustrative embodiment, as shown in FIG. 3, there is provided a skew force damping mechanism 20 which is configured to damp a force causing the skew of the transfer belt 14, (hereinafter, referred to as a skew force) by using a force which moves the transfer belt 14 in the axial direction D2.

Since it is sufficient to provide the skew force damping mechanism 20 at least one end of the driven roller in the axial direction D2, in the first illustrative embodiment, the skew force damping mechanism 20 is provided only at one end of the driven roller 16 in the axial direction.

2.3. Configuration of Skew Force Damping Mechanism

As shown in FIG. 5, the skew force damping mechanism 20 according to the first illustrative embodiment includes a belt collar 21 and a lever arm 22. The belt collar is mounted on the end portion of the rotating shaft 16A. The lever arm displaces, in the extension direction D1, one of the bearing blocks 18, which is provided on the left end of the rotating shaft where the belt collar 21 is provided.

The belt collar 21 is a displacement member which is made of resin (POM in the first illustrative embodiment) and can be displaced in the axial direction D2 together with the transfer belt 14 when the transfer belt 14 is displaced in the axial direction D2.

As shown in FIGS. 7A and 7B, the belt collar 21 is formed with a shaft hole 21A at a center thereof, into which the rotating shaft 16A is slidably inserted, and a collar-shaped flange portion 21B capable of coming into contact with the end face 14B (see FIG. 2) of the transfer belt 14 is formed at the outer peripheral portion of the belt collar. The end face 14B of the transfer belt 14 is an end portion of the transfer belt 14 in a direction (width direction) parallel to the axial direction D2.

The belt collar 21 can be slidably displaced on the rotating shaft 16A in the axial direction D2 while being rotated. Accordingly, when the transfer belt 14 is moved in the axial direction D2 and the end face 14B of the transfer belt 14 comes into contact with the flange portion 21B, the belt collar 21 receives a force from the transfer belt 14 in the axial direction D2 and is displaced in the axial direction D2 together with the transfer belt 14 as shown in FIG. 5.

The lever arm 22 is an axial force converting unit configured to convert a force which displaces the belt collar 21 in the axial direction D2 (hereinafter, this force is referred to as a displacement force F1) into a force which is a force in a direction intersecting the axial direction D2 and changes the tension strength generated at the extension surface 14A (hereinafter, this force is referred to as a tension adjusting force F2).

The direction of the tension adjusting force F2 is parallel to the extension direction D1 and parallel to the direction of the elastic force of the coil spring 19 in the first illustrative embodiment. Generally, the direction and magnitude of the displacement force F1 are same as those of the skew force.

Specifically, as shown in FIG. 8, the lever arm 22 includes first and second arm portions 22A and 22B. As shown in FIG. 5, the end of the cylindrical portion 21C of the belt collar 21 comes into contact with the first arm portion 22A, so that the first arm portion receives the displacement force F1 in the axial direction D2 from the belt collar 21.

The second arm portion 22B extends in a direction intersecting the extending direction of the first arm portion 22A, and applies the tension adjusting force F2 to the driven roller 16 through the bearing block 18. The first and second arm portions 22A and 22B are made of resin (for example, POM) or metal, and are formed integrally with each other.

Furthermore, the lever arm 22 is formed with a shaft hole 22C (see FIG. 8) at a connection portion between the first and the second arm portions 22A and 22B. The shaft hole 22C is used to swingably mount the lever arm 22 on the frame 17. The frame 17 includes a bearing part, to which a swing shaft 17 C inserted into the shaft hole 22C is provided.

The axial direction of the swing shaft 17C is set to a direction that intersects the direction of the elastic force of the coil spring 19 and intersects the axial direction D2 (a direction parallel to a direction orthogonal to the extension surface 14A in the illustrative embodiment).

Therefore, the lever arm 22 converts the displacement force F1 into a moment around the swing shaft 17C, and applies the tension adjusting force F2 to the bearing block 18. Accordingly, a ratio of the magnitude of the tension adjusting force F2 to the magnitude of the displacement force F1 corresponds to a ratio of a distance L1 between a swing center O1 and a force point(s) P1 to which the displacement force F1 is applied (hereinafter, referred to as the length of the first arm portion 22A) to a distance L2 between the swing center O1 of the lever arm 22 and a point P2 which applies the tension adjusting force F2 to the bearing block 18 (hereinafter, referred to as the length of the second arm portion 22B).

Further, in the first illustrative embodiment, the length L1 of the first arm portion 22A is set to be larger than the length L2 of the second arm portion 22B, so that it is possible to generate a large tension adjusting force F2 with a small displacement force F1 by increasing a ratio of the length L1 of the first arm portion 22A to the length L2 of the second arm portion 22B (hereinafter, referred to as a lever ratio β (=L1/L2)).

Figure 6:
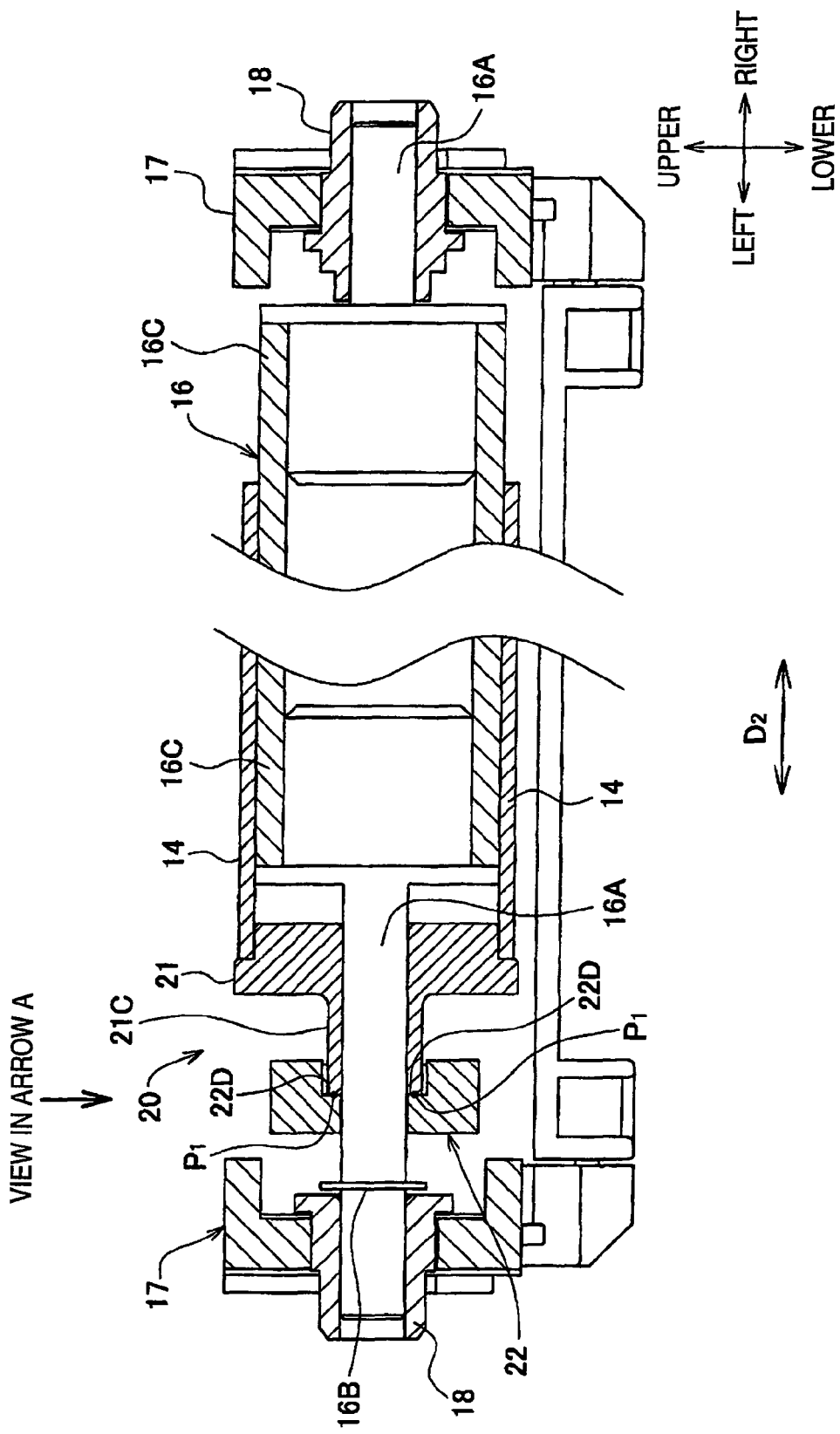
FIG. 6 is a cross-sectional view taken along a line VI-VI of FIG. 3.

As shown in FIG. 5, contact portions 22D of the first arm portion 22A, which come into contact with the cylindrical portion 21C of the belt collar 21, correspond to the force point(s) P1 to which the displacement force F1 is applied. When the contact portions 22D are seen in the direction of an arrow A (see FIG. 6), the force points P1 overlap the rotating shaft 16A of the driven roller 16. As shown in FIG. 6, the force points P1 are provided at symmetrical positions with respect to the rotating shaft 16A in the direction of the arrow A. The direction of the arrow A is a direction along the swing shaft 17C of the lever arm 22.

2.4. Operation of Skew Force Damping Mechanism

The magnitude of the displacement force F1 which is generated when the transfer belt 14 is moved in the axial direction D2 is increased as a difference between the tension strengths at one end and the other end of the transfer belt 14 in the moving direction (axial direction D2) is increased. The direction of the displacement force F1 is directed from the large-tension side to the small-tension side.

Therefore, for example, if the tension which is generated on the side where the belt collar 21 is provided (hereinafter, this tension is referred to as left tension T1) is smaller than the tension which is generated on the side where the belt collar 21 is not provided (hereinafter, this tension is referred to as right tension T2), the transfer belt 14 is moved toward the belt collar 21 while being rotated. Accordingly, the belt collar 21 is moved toward one end of the driven roller 16 in the axial direction together with the transfer belt 14, thereby applying the displacement force F1 to the lever arm 22.

Figure 9:
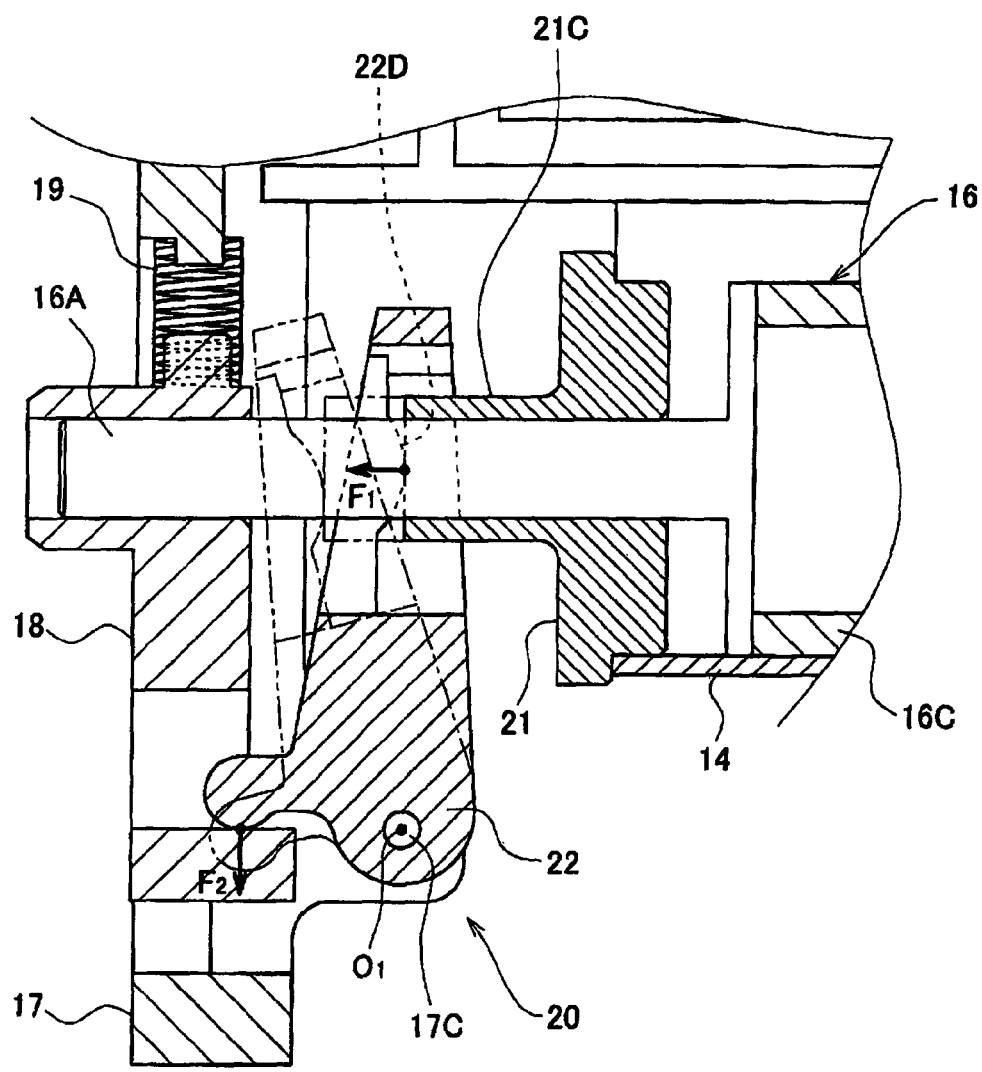
FIG. 9 is a view illustrating the operation of a skew force damping mechanism according to the first illustrative embodiment of the present invention.

Then, since the lever arm 22 swings around the swing shaft 17C so that the state of the lever arm shown by a solid line of FIG. 9 is changed to the state of the lever arm shown by a two-dot chain line, the bearing block 18 receives the tension adjusting force F2 from the lever arm 22 and is displaced so as to be separated from the driving roller 15.

It is noted that the swing angle of the lever arm 22 is emphasized in FIG. 9. The actual swing angle is too small to be visually confirmed. Therefore, even though the bearing block 18 is displaced, the axial direction of the driven roller 16 is maintained substantially parallel to the axial direction of the driving roller 15 and only the tension generated at the transfer belt 14 is changed. Accordingly, a distance between the extension surface 14A and the photosensitive drum 7A or the like is not changed.

When the bearing block 18 starts to be displaced to be separated from the driving roller 15, the left tension T1 is increased to greater than before the operation of the skew force damping mechanism 20 (lever arm 22). Therefore, the magnitude of the displacement force F1 is decreased to smaller than before and a skew force is damped, so that the movement of the transfer belt 14 is suppressed.

Meanwhile, as apparent from the above-described operation, in the first illustrative embodiment, the skew force damping mechanism 20 does not operate if the transfer belt 14 is moved to the side opposite to the belt collar 21 at an original state (before the operation of the skew force damping mechanism 20).

Accordingly, in the first illustrative embodiment, the transfer belt 14 is moved toward the belt collar 21 in an original state, by adjusting the initial load applied from the coil spring 19 at the time of shipment from a factory (at the time of design) so that the right tension T2 is larger than the left tension T1.

3. Characteristics of Image Forming Apparatus (Belt Unit) According to the First Illustrative Embodiment As described above, the skew force damping mechanism 20 according to the first illustrative embodiment is configured to increase the left tension T1. In other words, the skew force damping mechanism 20 changes the tension generated at the transfer belt 14 so that a tension ratio (Tb/Tf) of a tension Tb which is generated on the trailing side in the moving direction of the transfer belt 14, of the tension generated at the transfer belt 14, to a tension Tf which is generated on the leading side in the moving direction of the transfer belt 14, is decreased to become smaller than before the change of the tension. Herein, when a tension ratio is actually measured and calculated, it is advantageous that tension generated at the end of the belt in the width direction be measured.

Figure 10:
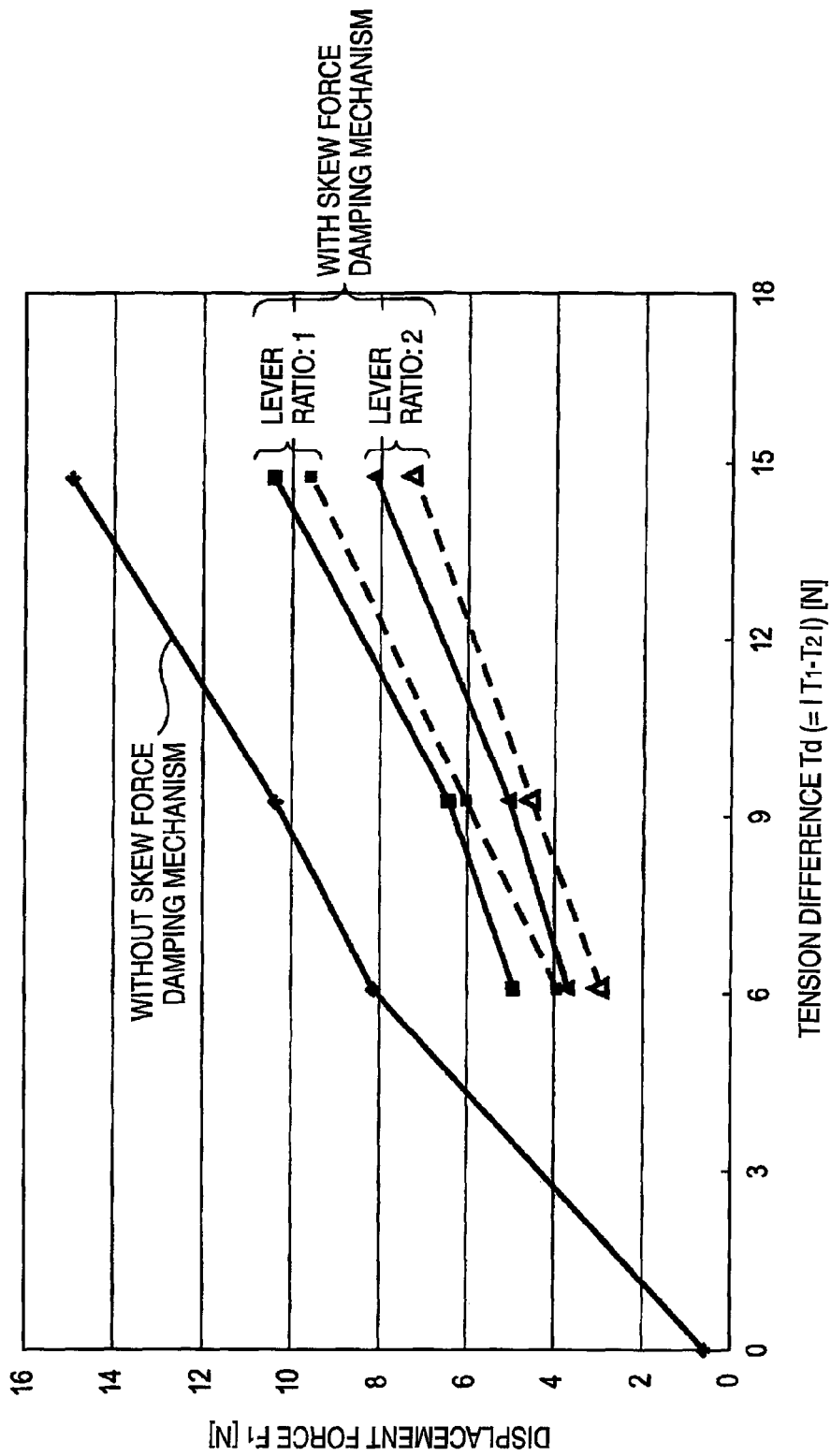
FIG. 10 is a graph showing a relationship between a displacement force and a tension difference.

That is, as shown in FIG. 10, the displacement force F1 for displacing the transfer belt 14 in the axial direction is increased as a tension difference Td is increased. The direction of the displacement force F1 is directed from the large-tension side to the small-tension side.

The solid lines of FIG. 10 show relationships between the tension difference Td and the displacement force F1 when the tension difference and the displacement force are actually measured. As shown in the graph, it is practically reasonable to consider that the displacement force F1 is substantially linearly changed in proportion to the change of the tension difference Td. An average change rate (=ΔF1/ΔTd) of the displacement force F1 to the tension difference Td at an initial setting (when a force is not applied from the lever arm 22) is hereinafter referred to as a displacement force conversion coefficient α.

In the first illustrative embodiment, an actual measured value of the displacement force F1 is obtained by measuring a force which is applied to the point P2 with a pressure sensor and dividing the actual measured value by the lever ratio β.

When the transfer belt 14 is moved in the axial direction D2 and the displacement force F1 is converted into the tension adjusting force F2 by the lever arm 22 with the movement of the transfer belt 14, the tension Tf (left tension T1) which is generated on the leading side in the moving direction of the transfer belt 14 is increased to be greater than before the change of the tension, so that the tension ratio is decreased to be less than before. Accordingly, the tension difference Td is decreased and the magnitude of the displacement force F1 is decreased, so that the skew of the transfer belt 14 is suppressed. As a result, the rotational path of the transfer belt 14 can be stabilized.

Therefore, in the first illustrative embodiment, since the skew of the transfer belt 14 can be suppressed without displacing the rotating shaft of the driven roller 16 or the driving roller 15 in a direction orthogonal to the extension surface 14A, it is possible to stabilize the rotational path of the transfer belt 14 by suppressing the skew of the transfer belt 14 while reducing a negative influence on an image formation in comparison with a configuration which displaces the rotating shaft of the driven roller in an upper-lower direction, so that the damage of the end of the transfer belt 14 in the width direction can be suppressed.

Meanwhile, assuming that a load applied from the coil spring 19, which is provided on the side corresponding to the skew force damping mechanism 20, at the initial setting is denoted by FsL and a load applied from the coil spring 19, which is provided on the side opposite to the skew force damping mechanism 20, at the initial setting is denoted by FsR (>FsL), the following Expression (1) is satisfied when the lever arm 22 operates and displaces the bearing block 18. Further, the Expression (2) can be obtained from the Expression (1).

As apparent from Expression (2), the displacement force F1 is increased in proportion to the tension difference Td based on the difference in an initial setting load, and is decreased as the lever ratio β is increased. If the lever ratio β is zero, that is, if the skew force damping mechanism 20 is not provided, the displacement force F1 is determined by the tension difference Td based on the difference in the initial setting load, and the magnitude of the displacement force is larger than the case where the lever ratio β is larger than zero, that is, the case where the skew force damping mechanism 20 operates.

$$F1=\alpha\{FsR-(FsL+\beta \times F1)\} \quad \text{Expression (1)}$$

$$F1=\alpha(FsR-FsL)/(1+\alpha \times \beta) \quad \text{Expression (2)}$$

Herein, F1 denotes the displacement force, α denotes the displacement force conversion coefficient, and β denotes the lever ratio.

Broken lines of FIG. 10 show the values (theoretical value) of the displacement force F1 which is calculated when the displacement force conversion coefficient α is 1.0. The actual measured values substantially correspond to the theoretical values regardless of the lever ratio β. Accordingly, it is possible to suppress the skew of the transfer belt 14 or the damage of the end of the transfer belt 14 in the width direction by selecting an appropriate lever ratio β.

It is noted that the displacement force conversion coefficient α is a value obtained by tests, so that the value varies for each image forming apparatus. Generally, the displacement force conversion coefficient is within a range of about 0.1 to 1.5. Accordingly, it is possible to improve the accuracy of the theoretical value by further optimizing the displacement force conversion coefficient α.

Further, in the first illustrative embodiment, the coil spring 19 generates a tension at the transfer belt 14 by applying an urging force, which increases a distance between the axis of the driven roller 16 and the axis of the driving roller 15, to the driven roller 16. Accordingly, in the first illustrative embodiment, the driven roller 16 also has a function of a so-called tension roller.

Further, in the first illustrative embodiment, the tension generated at the transfer belt 14 is changed (adjusted) by applying the tension adjusting force F2 to the driven roller 16 which as a function of a tension roller. Accordingly, a tension roller does not need to be separately provided, and it may be possible to increase the degree of freedom in designing the image forming apparatus while reducing the number of parts of the image forming apparatus.

Further, in the first illustrative embodiment, the driven roller 16 is regulated by the inner wall surfaces 17B of the long holes 17A to be displacable only in a direction parallel to the direction of the urging force. Accordingly, it may be possible to adjust the tension which is generated at the transfer belt 14 by efficiently using the tension adjusting force F2 that is converted by the lever arm 22.

That is, a force parallel to the direction of the urging force is a force for controlling the magnitude of the tension generated at the transfer belt 14 (extension surface 14A). Accordingly, if the displacement of the driven roller 16 is not regulated, it is concerned that the tension adjusting force F2 does not contribute to the generation of a tension and is unnecessarily used as frictional resistance.

In contrast, in the first illustrative embodiment, the displacement of the driven roller 16 is regulated so that the driven roller 16 is displaced only in a direction parallel to the direction of the urging force. Accordingly, it is possible to make a large portion of the tension adjusting force F2 contribute to the generation of tension. Therefore, it is possible to suppress the tension adjusting force that is unnecessarily used as frictional resistance, and to adjust the tension, which is generated at the transfer belt 14, by efficiently using the tension adjusting force.

Further, in the first illustrative embodiment, the direction of a force which is applied to the driven roller 16 by the lever arm 22 is parallel to the elastic force applied from the coil spring 19. Accordingly, it is possible to make a large portion of the tension adjusting force F2 contribute to the generation of a tension. Therefore, it is possible to suppress the tension adjusting force that is unnecessarily used as frictional resistance, and to adjust the tension, which is generated at the transfer belt 14, by efficiently using the tension adjusting force.

Further, in the first illustrative embodiment, the displacement force F1 is converted into the tension adjusting force F2 by the lever arm 22 which is bent in a V or L shape. Accordingly, it is possible to convert the displacement force F1 into the tension adjusting force F2 by the simple structure.

Further, in the first illustrative embodiment, it is possible to easily change the tension adjusting force F2 by adjusting the length L1 of the first arm portion 22A with respect to the length L2 of the second arm portion 22B (the lever ratio). Accordingly, it is possible to increase the degree of freedom in designing the lever arm 22 (skew force damping mechanism 20).

Further, in the first illustrative embodiment, a force is applied to the driven roller 16 through the bearing block 18, so that the force is applied similarly to the case where an urging force is directly applied to the driven roller 16. Therefore, it is possible to adjust the tension which is generated at the transfer belt 14 by efficiently using the tension adjusting force F2, in comparison with the case where an urging force is indirectly applied to the driven roller 16.

Further, in the first illustrative embodiment, the lever ratio is set to be larger than 1. Accordingly, even when the displacement force F1 is small, it is possible to generate a large tension adjusting force F2 and to easily change the tension which is generated at the transfer belt 14.

Further, in the first illustrative embodiment, as shown in FIG. 5, the force points P1 of the lever arm 22, which receive force from the belt collar 21, overlap the rotating shaft 16A of the driven roller 16 when seen in the direction of the arrow A along the axial direction of the swing shaft 17C. Accordingly, it is possible to reduce the moment around the rotation center axis of the driven roller which is caused by the frictional force generated at the force points P1, and to reduce a distance between the rotation center axis of the driven roller 16 and the force points P1 in comparison with the case where the force points P1 are positioned at a position deviating from the rotating shaft 16A when seen in the direction of the arrow A.

Meanwhile, since this moment becomes a force for hindering the operation of the belt collar 21, it is advantageous that this moment be as small as possible. Accordingly, in the first illustrative embodiment, it is possible to reduce the moment around the rotation center axis of the driven roller 16, which is caused by the frictional forces generated at the force points P1. As a result, it is possible to suppress the hindrance of the operation of the belt collar 21.

Further, when seen in the direction of the arrow A, the force points P1 overlap the rotating shaft 16A. Accordingly, even when the lever arm 22 swings, it is possible to reduce the change of a distance between the force points P1 and the swing center of the lever arm 22.

Further, in the first illustrative embodiment, the contact portion 22D of the lever arm 22, which receives the displacement force F1, is formed into a curved surface shape (see FIG. 9). Accordingly, even though an contact angle between the lever arm 22 and the belt collar 21 is changed due to the swing of the lever arm 22, it is possible to make the lever arm 22 be smoothly brought into sliding contact with the belt collar 21 and to suppress the excessive increase of the frictional force which is generated at the force points P1.

Further, in the first illustrative embodiment, it is possible to reduce the change of the force which is applied to the belt collar 21 from the lever arm 22 as reaction, so that the hindrance of the operation of the belt collar 21 can be suppressed.

Further, in the first illustrative embodiment, as shown in FIG. 6, the force points P1 are positioned symmetrically on both sides of the rotating shaft 16A in the direction of the arrow A. Accordingly, the force which is applied to the belt collar 21 from the lever arm 22 as reaction is symmetric with respect to the rotating shaft 16A, so that it is possible to smoothly displace the belt collar 21 in the axial direction.

That is, if the force which is applied to the belt collar 21 from the lever arm 22 as reaction is not symmetric with respect to the rotating shaft 16A, a couple of force is generated at the belt collar 21. Accordingly, the displacement of the belt collar 21 in the axial direction becomes not smooth.

In contrast, in the first illustrative embodiment, the force which is applied to the belt collar 21 from the lever arm 22 as reaction is symmetric with respect to the rotating shaft 16A, so that a couple of force is not generated at the belt collar 21. Accordingly, it is possible to smoothly displace the belt collar 21 in the axial direction.

Further, in the first illustrative embodiment, the collar-shaped flange portion 21B which comes into contact with the end face 14B of the transfer belt in the width direction is formed at the belt collar 21. Therefore, it is possible to reliably transmit a force in the axial direction (displacement force F1) which is generated due to the skew of the transfer belt 14, to the belt collar 21, so that the skew of the transfer belt 14 can be appropriately suppressed.

Second Illustrative Embodiment

Figure 11:
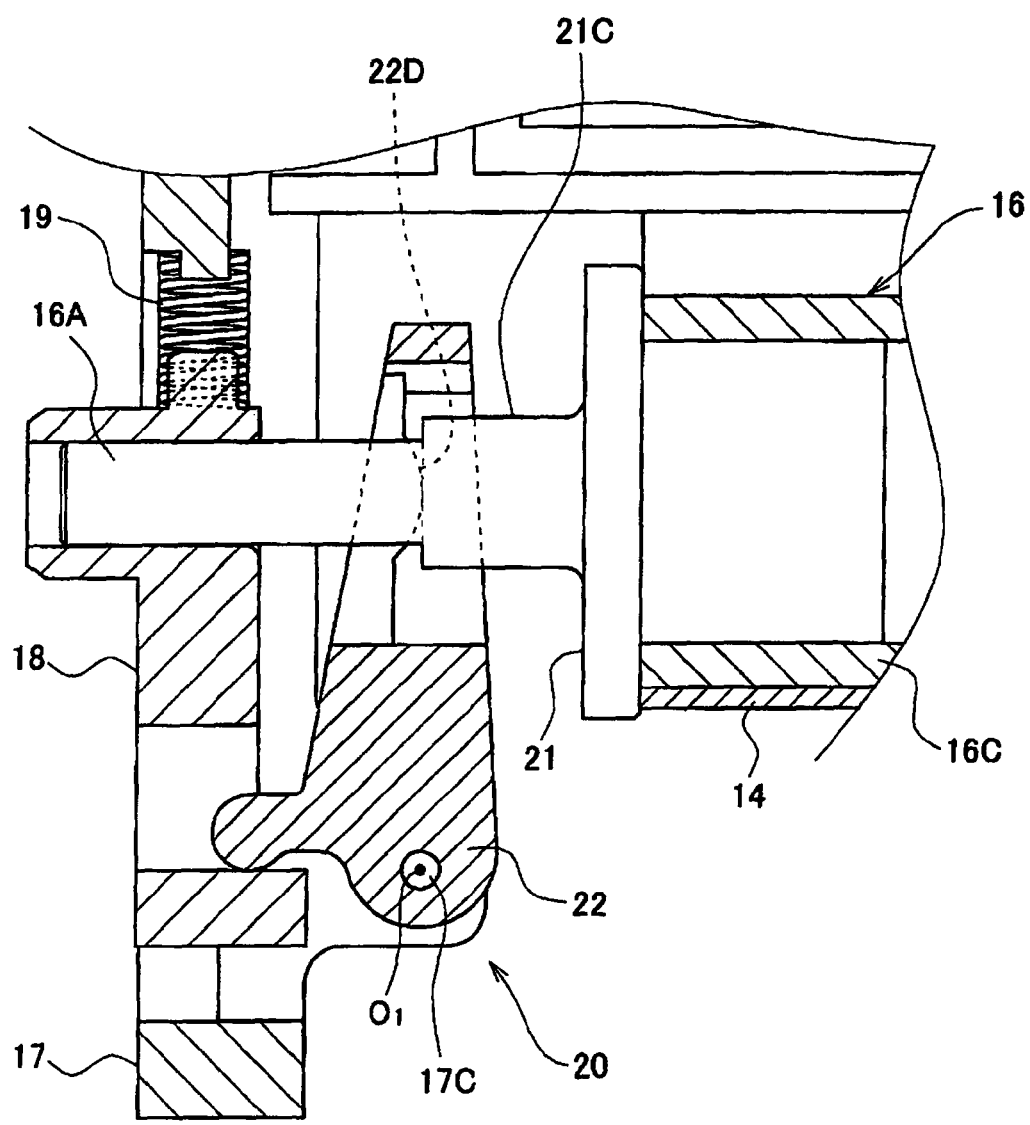
FIG. 11 is a view showing a skew force damping mechanism according to a second illustrative embodiment of the present invention.

In the above-described illustrative embodiment, the belt collar 21 and the driven roller 16 are formed separately. However, in the second illustrative embodiment, the belt collar 21 is formed integrally with the driven roller 16 as shown in FIG. 11.

According to the second illustrative embodiment, since it is possible to suppress the increase of the number of parts in the image forming apparatus 1, the increase in the manufacturing cost of the image forming apparatus 1 can be suppressed.

Third Illustrative Embodiment

Figure 12:
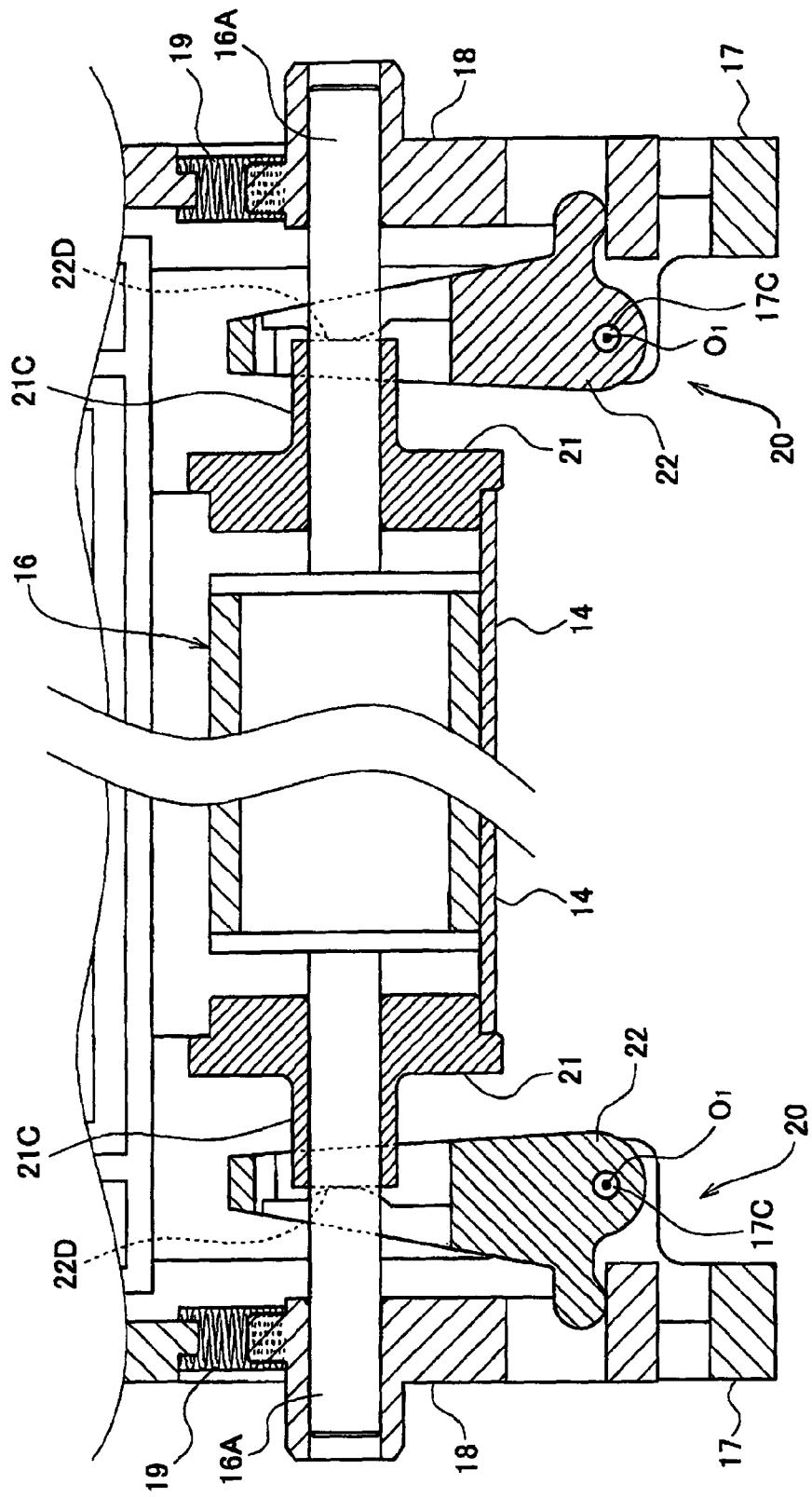
FIG. 12 is a view showing a skew force damping mechanism according to a third illustrative embodiment of the present invention.

In the above-described illustrative embodiments, the skew force damping mechanism 20 is provided only at one end of the driven roller 16 in the axial direction. However, in the third illustrative embodiment, the skew force damping mechanisms 20 are provided at both ends of the driven roller 16 as shown in FIG. 12.

According to the third illustrative embodiment, similarly to the first illustrative embodiment, it is possible to suppress the skew of the transfer belt 14 without displacing the rotating shaft of the driven roller 16 or the driving roller 15 in a direction orthogonal to the extension surface 14A. Therefore, it is possible to stabilize the rotational path of the transfer belt 14, so that the damage of the end of the transfer belt 14 in the width direction can be suppressed.

In the third illustrative embodiment, since the skew force damping mechanisms 20 are provided at both ends of the driven roller 16 in the axial direction, the tension difference Td does not need to be positively provided at the time of shipment from a factory (at the time of design) unlike in the first illustrative embodiment.

Fourth Illustrative Embodiment

In the above-described illustrative embodiments, the skew force damping mechanism 20 is configured to displace the bearing block 18 only in a direction where the tension is increased. However, the skew force damping mechanism 20 of the fourth illustrative embodiment is configured to displace the bearing block 18 in both direction where the tension is increased and where the tension is decreased.

Figure 13:
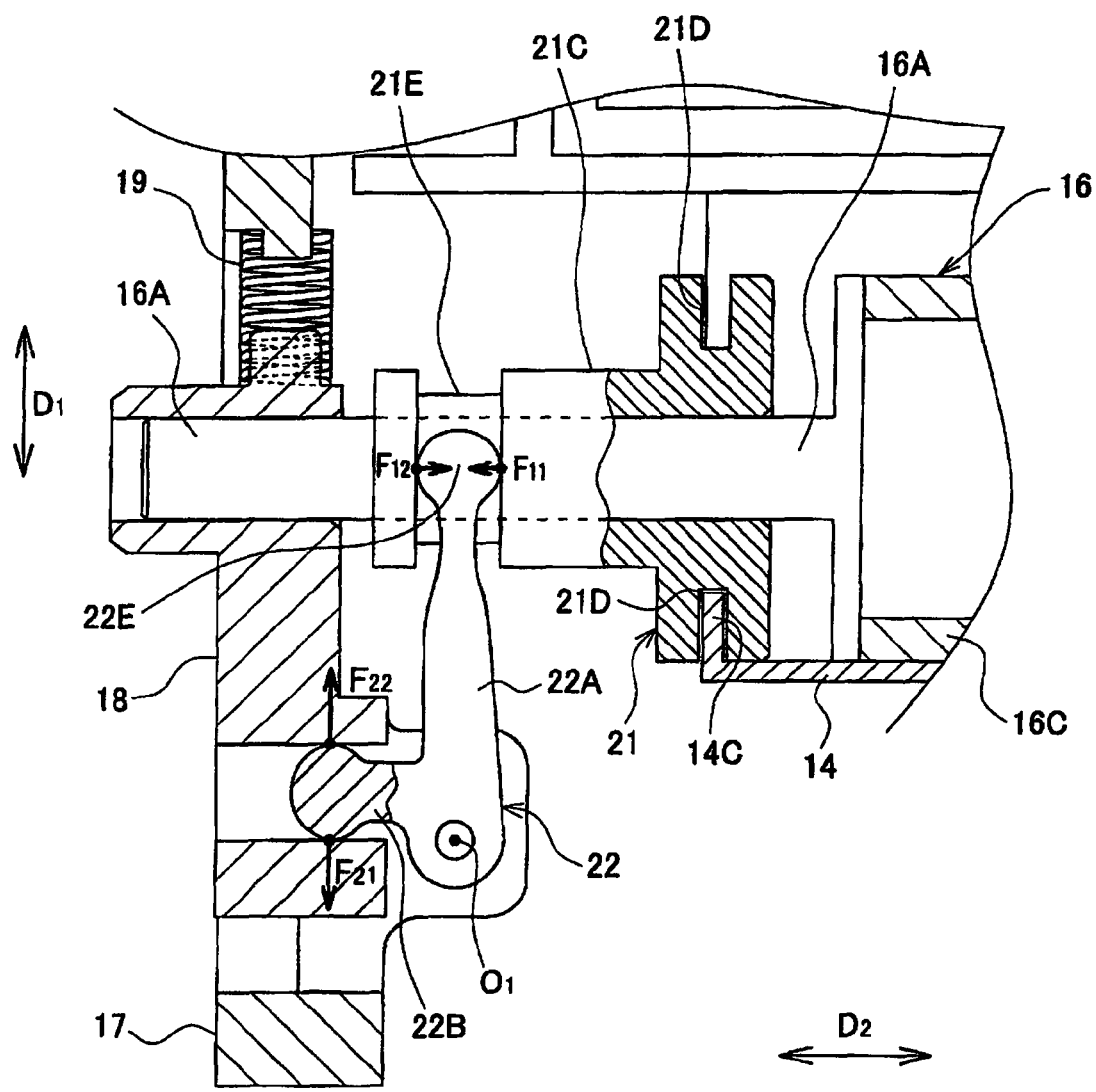
FIG. 13 is a view showing a skew force damping mechanism according to a fourth illustrative embodiment of the present invention.

1. Configuration and Operation of Skew Force Damping Mechanism of Fourth Illustrative Embodiment As shown in FIG. 13, the transfer belt 14 is provided with a guide belt 14C which protrudes toward the belt collar 21 (rotating shaft 16A) from the inner peripheral surface thereof. The belt collar 21 is formed with a groove 21D to which the guide belt 14C is fitted, at a portion of the outer peripheral surface thereof.

Accordingly, in the fourth illustrative embodiment, the transfer belt 14 (guide belt 14C) and the belt collar 21 are locked to each other. Accordingly, even though the transfer belt 14 is moved toward any side in the axial direction D2 (left-right direction in the drawing), the belt collar 21 and the transfer belt 14 are moved in the same direction collectively.

Further, a groove 21E to which spherical surface portions 22E formed at the ends of the first arm portions 22A are fitted is formed at the cylindrical portion 21C of the belt collar 21, and the spherical surface portions 22E are provided on both sides of the rotating shaft 16A and are slidably fitted to the groove 21E.

Accordingly, if the belt collar 21 is moved in a direction which is directed to the right side from the left side in the drawing (hereinafter, this direction is referred to as a right direction), the belt collar 21 applies a displacement force F12 to the lever arm 22 toward the right side. Then, the lever arm 22 applies a tension adjusting force F22 to the bearing block 18 in a direction where the left tension T1 is decreased.

If the belt collar 21 is moved in a direction which is directed to the left side from the right side in the drawing (hereinafter, this direction is referred to as a left direction), the belt collar 21 applies a displacement force F11 to the lever arm 22 toward the left side. Then, the lever arm 22 applies a tension adjusting force F21 to the bearing block 18 in a direction where the left tension T1 is increased.

2. Characteristics of Skew Force Damping Mechanism of the Fourth Illustrative Embodiment If the left tension T1 is smaller than the right tension T2, the transfer belt 14 is moved toward the left side, so that the lever arm 22 converts the displacement force F11 into the tension adjusting force F21. Accordingly, the skew force damping mechanism 20 of the fourth illustrative embodiment increases the tension Tf (left tension T1) which is generated on the leading side in the moving direction of the transfer belt 14 to be greater than before. Therefore, the tension ratio and the tension difference Td are decreased and the skew of the transfer belt 14 is suppressed, so that it is possible to stabilize the rotational path of the transfer belt 14 and possible to suppress the damage of the end of the transfer belt 14 in the width direction.

In contrast, if the left tension T1 is larger than the right tension T2, the transfer belt 14 is moved toward the right side, so that the lever arm 22 converts the displacement force F12 into the tension adjusting force F22. Accordingly, the skew force damping mechanism decreases the tension Tb (left tension T1), which is generated on the trailing side in the moving direction of the transfer belt 14, to less than before. Accordingly, the tension ratio and the tension difference Td are decreased and the skew of the transfer belt 14 is suppressed, so that it is possible to stabilize the rotational path of the transfer belt 14 and possible to suppress the damage of the end of the transfer belt 14 in the width direction.

In the fourth illustrative embodiment, even though the transfer belt 14 is moved toward any side, the lever arm 22 (skew force damping mechanism 20) operates so that the tension ratio is decreased as described above. Accordingly, it is possible to quickly suppress the skew of the transfer belt 14.

Further, in the fourth illustrative embodiment, even though the transfer belt 14 is moved toward any side, the lever arm 22 (skew force damping mechanism 20) operates so that the tension ratio is decreased. Accordingly, the tension difference Td does not need to be positively generated at the time of shipment from a factory (at the time of design) unlike in the first illustrative embodiment.

Fifth Illustrative Embodiment

Figure 14:
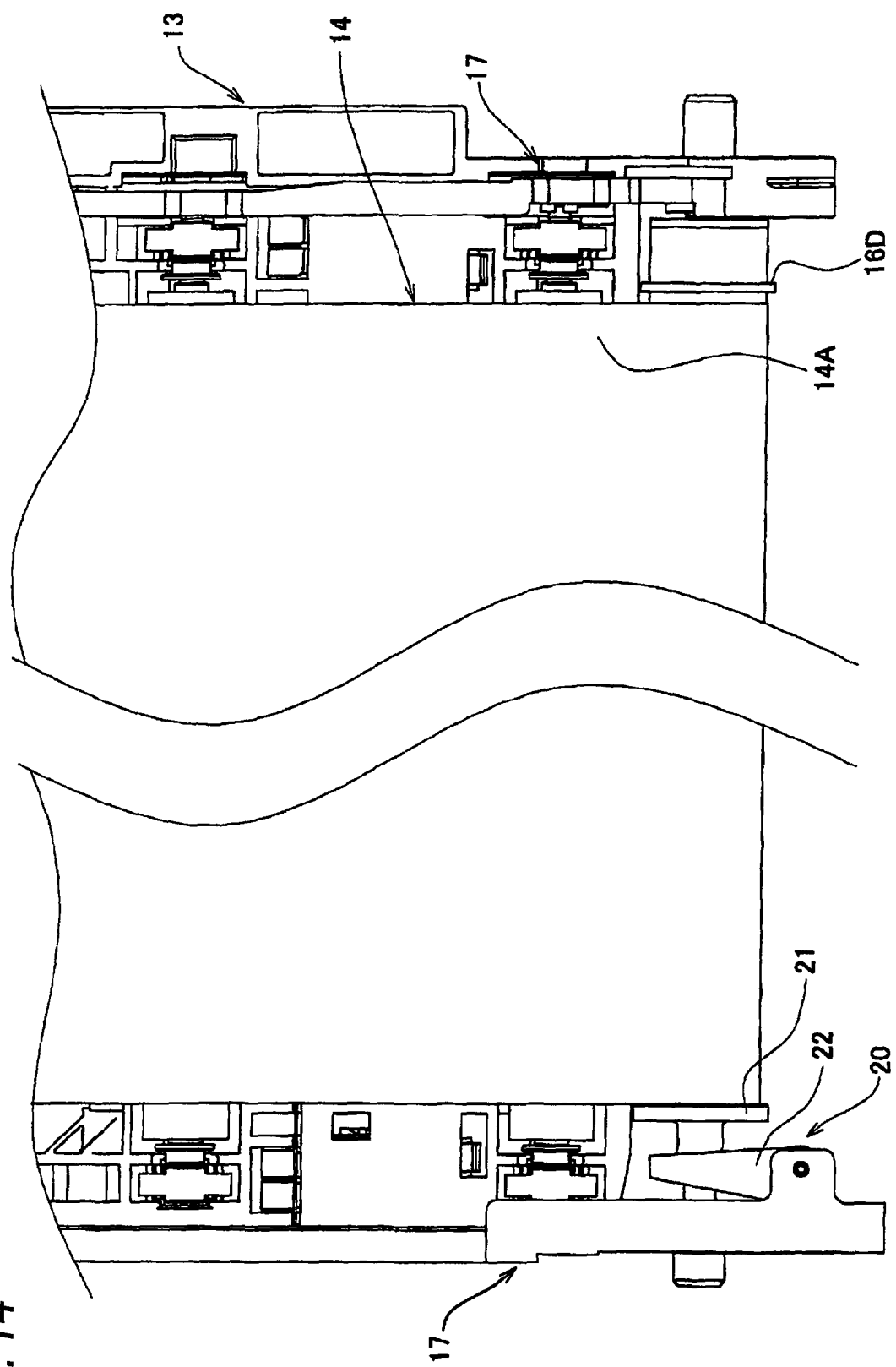
FIG. 14 is a view showing a skew force damping mechanism according to a fifth illustrative embodiment of the present invention.

In the fifth illustrative embodiment, the skew force damping mechanism 20 is provided only at one end of the driven roller 16 in the axial direction as shown in FIG. 14, and a collar-shaped flange portion 16D which regulates the movement of the transfer belt 14 by coming into contact with the end of the transfer belt 14 is provided at the other end of the driven roller.

Accordingly, in the fifth illustrative embodiment, the movement of the transfer belt 14 toward the other end of the driven roller in the axial direction is regulated by the flange portion 16D. Therefore, the tension difference Td may be set to be small at the time of shipment from a factory (at the time of design) in comparison with the first illustrative embodiment.

Sixth Illustrative Embodiment

Figure 15:
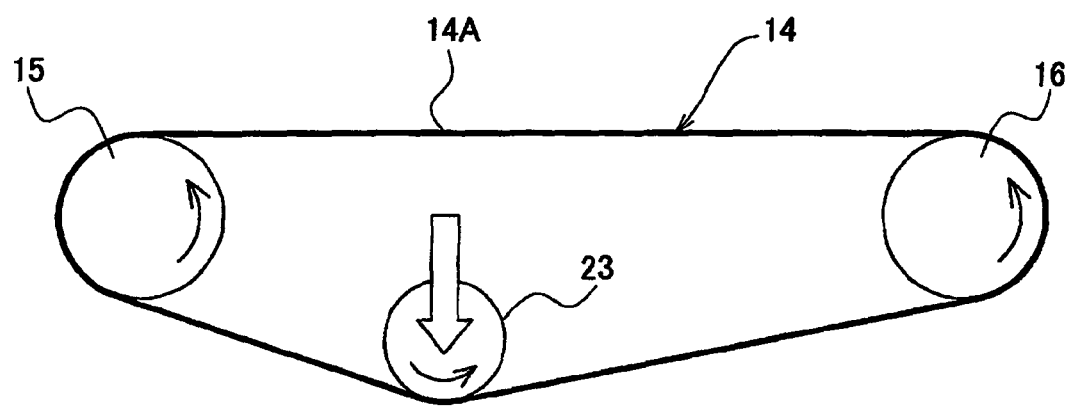
FIG. 15 is a view showing a belt unit according to a sixth illustrative embodiment of the present invention.

In the above-described illustrative embodiment, the driven roller 16 functions as a tension roller. However, in the sixth illustrative embodiment, a tension roller 23 is provided separately from the driven roller 16 as shown in FIG. 15, and the skew force damping mechanism 20 is provided at one or both ends of the tension roller 23 in the axial direction of the tension roller.

Seventh Illustrative Embodiment

The seventh illustrative embodiment is a modification of the sixth illustrative embodiment. Specifically, in the seventh illustrative embodiment, the tension roller 23 has only a function to apply a tension to the transfer belt 14, and the skew force damping mechanism 20 is provided at one or both ends of the driven roller 16 in the axial direction of the driven roller.

That is, in the above-described illustrative embodiment, the skew force damping mechanism 20 is provided at the roller which has a function to apply a tension to the transfer belt 14. However, in the seventh illustrative embodiment, the skew force damping mechanism 20 is provided at a roller different from a roller which applies a tension to the transfer belt 14.

Eighth Illustrative Embodiment

Figure 16:
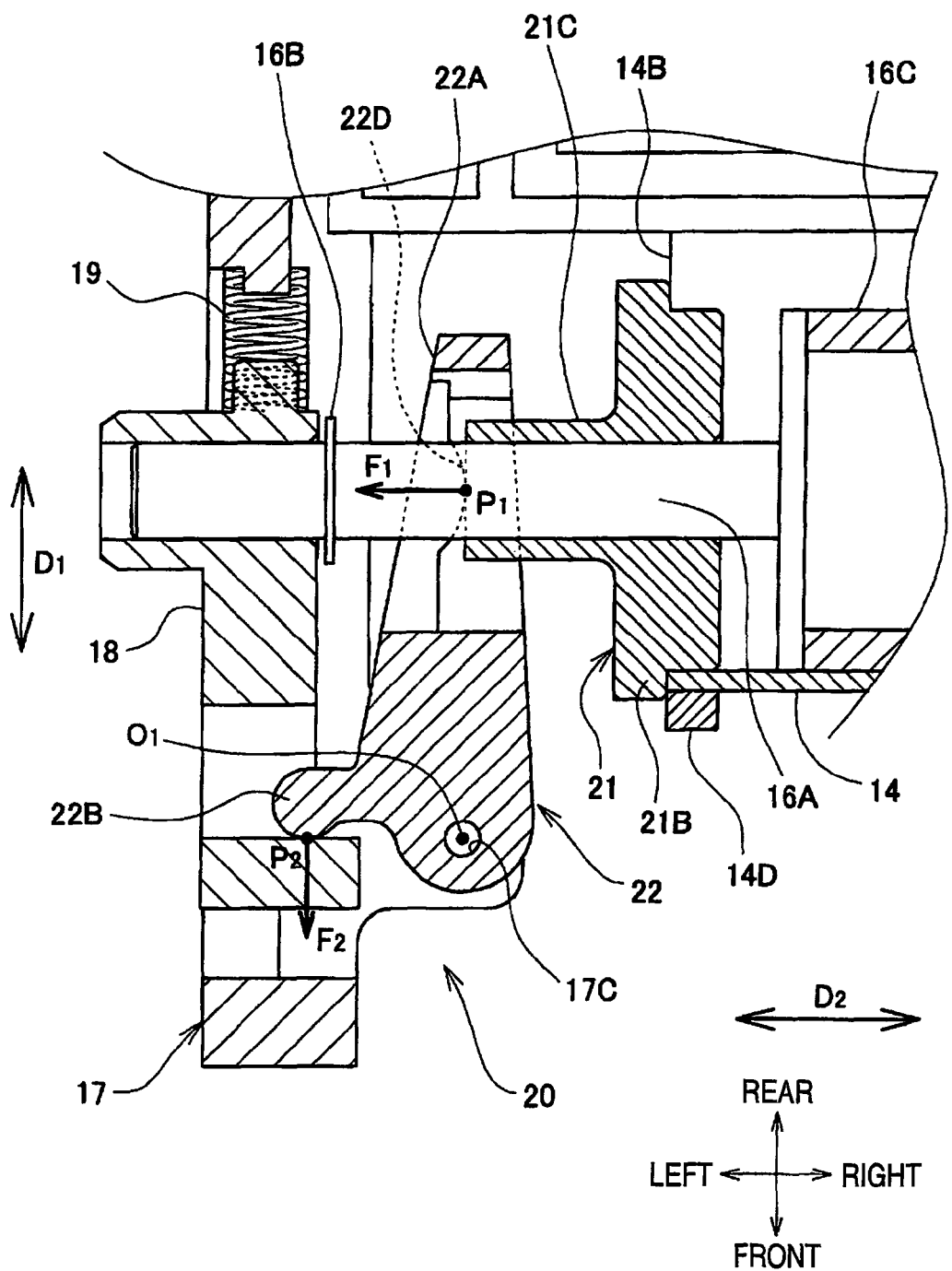
FIG. 16 is a view showing a transfer belt according to an eighth illustrative embodiment of the present invention.

In the eighth illustrative embodiment, as shown in FIG. 16, a reinforcing tape 14D which reinforces an end 14B of the transfer belt in a width direction is provided at least one end, which corresponds to the belt collar 21, of the ends of the transfer belt 14 in the width direction of the transfer belt 14.

The reinforcing tape 14D of the eighth illustrative embodiment is made of PET, and is bonded or fixed to the transfer belt 14 by adhesion. In FIG. 16, the reinforcing tape 14D is provided on the outer peripheral surface of the transfer belt 14, however, the present invention is not limited thereto. If a clearance groove to which the reinforcing tape 14D is fitted is formed at the belt collar 21, the reinforcing tape 14D may be provided on an inner peripheral surface of the transfer belt 14.

Other Illustrative Embodiments

While the present invention has been shown and described with reference to certain illustrative embodiments thereof, it will be understood by those skilled in the art that various changes in form and details may be made therein without departing from the spirit and scope of the invention as defined by the appended claims.

In the above-described illustrative embodiments, the present invention is applied to a direct tandem electrophotographic image forming apparatus. However, the application of the present invention is not limited thereto.

Further, in the above-described illustrative embodiments, the present invention is applied to the belt unit 13 for conveying a sheet. However, the application of the present invention is not limited thereto. For example, the present invention may be applied to a belt unit for an intermediate transfer belt, a belt unit of an automatic document feeder (ADF) which conveys a document, or a belt unit for a fixer.

Further, in the above-described illustrative embodiments, the lever arm 22 is described as an example of the axial force converting unit, however, the present invention is not limited thereto. For example, the present invention may employ an axial force converting unit which converts the displacement force F1 into the tension adjusting force F2 by using a wedge effect, or an axial force converting unit which changes air pressure or fluid pressure by the displacement force F1 to convert the displacement force F1 into the tension adjusting force F2.

Further, in the above-described illustrative embodiments, the force points P1 of the lever arm 22 overlap the rotating shaft 16A of the driven roller 16 when seen in the direction of the arrow A along the axial direction of the swing shaft 17C. However, the present invention is not limited thereto.

Further, in the above-described illustrative embodiments, the force points P1 are provided on both sides of the rotating shaft 16A. However, the present invention is not limited thereto.

It is advantageous that the force points P1 be positioned on the center line of the rotating shaft 16A. Since the rotating shaft 16A passes through the lever arm 22 in the above-described illustrative embodiment, it is not possible to set the actual force points P1 on the center line of the rotating shaft 16A.

However, since two force points P1 are positioned at positions symmetric with respect to the rotating shaft 16A, a resultant force point (virtual force point) of the two force points P1 is positioned on the center line of the rotating shaft 16A. If the bearing block 18 is provided between the lever arm 22 and the belt collar 21, it is possible to set an actual force point P1 on the center line of the rotating shaft 16A.

Further, in the above-described illustrative embodiments, the flange portion 21B is formed at the belt collar 21. However, the present invention is not limited thereto, and the flange portion 21B may be omitted.

Further, in the above-described illustrative embodiments, the coil spring 19 is used as an example of the tension generating member, however, the invention is not limited thereto. For example, a tension coil spring, a torsion spring, rubber, or the like may be used as the tension generating member.

Further, in the above-described illustrative embodiments, the lever ratio is set to be larger than 1, however the present invention is not limited thereto. The lever ratio may be set to 1 or less. If the lever ratio is set to 1 or less, the length of a first lever 23A becomes short with respect to the moving distance of the belt collar 21. Accordingly, it is possible to reduce the dimension of the belt unit 19 in the front-rear direction and the left-right direction.

Further, in the above-described illustrative embodiments, the axial direction of the swing shaft 17C is set to a direction parallel to the direction orthogonal to the extension surface 14A. However, if the axial direction of the swing shaft 17C is set to a direction intersecting the axial direction D2 and the direction of the elastic force of the coil spring 19, the axial direction of the swing shaft may be set to a direction other than the direction orthogonal to the extension surface 14A.

Further, a portion to which the tension adjusting force F2 converted by the axial force converting unit is applied may be any portion which causes change in the tension of the belt 14.

What is claimed is:

1. An image forming apparatus configured to form an image on a sheet, the image forming apparatus comprising:
   an endless belt;
   a driving roller which is configured to rotationally drive the belt;
   a driven roller which is configured to be rotationally driven with the rotation of the belt, wherein the belt has an extension surface defined by a flat region between the driving roller and the driven roller;
   a frame which supports the driving roller and the driven roller;
   a bearing member which is provided to the frame to be displacable, and rotatably supports the driven roller;
   a tension generating member including a spring which is configured to generate an urging force to generate a tension at the belt;
   a displacement member which is provided to be displacable in a displacement direction parallel to an axial direction of the driven roller, and which is displaced in the displacement direction together with the belt when the belt is moved in a moving direction along the displacement direction during the rotation of the belt; and
   an axial force converting unit which is configured to convert a force of displacing the displacement member into a force which is directed in a direction intersecting the displacement direction and causes the tension generated at the belt to change such that a ratio of a tension generated on a trailing side in the moving direction of the belt to a tension generated on a leading side in the moving direction of the belt is decreased, wherein the axial force converting unit does not cause the driven roller to become inclined relative to the extension surface,
   wherein the axial force converting unit includes an arm member including:
   a first arm portion configured to receive a force parallel to the axial direction of the driven roller from the displacement member; and
   a second arm portion which extends in a direction intersecting an extending direction of the first arm portion, and which is configured to apply a force to the driven roller,
   wherein the arm member is swingably provided to the frame,
   wherein the spring of the tension generating member contacts the bearing member at a first position to apply the urging force to the driven roller, and
   wherein the second arm portion of the arm member contacts the bearing member at a second position different from the first position to apply the force to the driven roller.

2. The image forming apparatus according to claim 1, wherein the driven roller is provided to the frame to be displacable in a direction parallel to the direction of the tension generated at the belt,
   wherein the tension generating member generates the tension at the belt by applying the urging force to the driven roller to increase a distance between an axis of the driven roller and an axis of the driving roller, and
   wherein the axial force converting unit changes the tension generated at the belt by applying a force to at least one of both ends of the driven roller in the axial direction.

3. The image forming apparatus according to claim 1, further comprising:
   a regulating member configured to regulate a displacement of the driven roller only in a direction parallel to a direction of the urging force generated by the tension generating member.

4. The image forming apparatus according to claim 2, wherein a direction of the force which is applied to the driven roller by the axial force converting unit is parallel to a direction of the urging force generated by the tension generating member.

5. The image forming apparatus according to claim 1, wherein the displacement member is formed integrally with the driven roller.

6. The image forming apparatus according to claim 1, wherein a distance between a swing center of the arm member and a point of the first arm member, which receives the force from the displacement member is larger than a distance between the swing center of the arm member and a point of the second arm portion, which applies the force to the driven roller.

7. The image forming apparatus according to claim 1, wherein a force point of the axial force converting unit, to which the force is applied from the displacement member, overlaps a shaft of the driven roller when seen in a direction along a swing shaft of the arm member.

8. The image forming apparatus according to claim 7, wherein the force point has at least two points which are provided on both sides of the shaft of the driven roller when seen in the direction along the swing shaft of the arm member.

9. The image forming apparatus according to claim 1, wherein axial force converting units are provided at both ends of the driven roller in the axial direction of the driven roller.

10. The image forming apparatus according to claim 1, wherein the displacement member includes a collar-shaped flange portion configured to contact an end face of the belt in the axial direction of the driven roller.

11. The image forming apparatus according to claim 1, further comprising:
a plurality of image forming units which are provided in series in a rotating direction of the belt to oppose the extension surface of the belt, respectively.

12. The image forming apparatus according to claim 11, wherein the plurality of image forming units directly form images on a sheet conveyed on the extension surface.

13. The image forming apparatus according to claim 1, wherein a swing axis of the arm member is provided at an opposite side to the spring with respect to an axis of the driven roller.

14. A belt unit comprising:
an endless belt;
a driving roller which is configured to rotationally drive the belt;
a driven roller which is configured to be rotationally driven with the rotation of the belt, wherein the belt has an extension surface defined by a flat region between the driving roller and the driven roller;
a frame which supports the driving roller and the driven roller;
a bearing member which is provided to the frame to be displacable, and rotatably supports the driven roller;
a tension generating member including a spring which is configured to generate an urging force to generate a tension at the belt;
a displacement member which is provided to be displacable in a displacement direction parallel to an axial direction of the driven roller, and which is displaced in the displacement direction together with the belt when the belt is moved in a moving direction along the displacement direction during the rotation of the belt; and
an axial force converting unit which is configured to convert a force of displacing the displacement member into a force which is directed in a direction intersecting the displacement direction and predominately parallel to the extension surface which causes the tension generated at the belt to change such that a ratio of a tension generated on a trailing side in the moving direction of the belt to a tension generated on a leading side in the moving direction of the belt is decreased,
wherein the axial force converting unit includes an arm member including:
a first arm portion configured to receive a force parallel to the axial direction of the driven roller from the displacement member; and
a second arm portion which extends in a direction intersecting an extending direction of the first arm portion, and which is configured to apply a force to the driven roller, and
wherein the arm member is swingably provided to the frame,
wherein the spring of the tension generating member contacts the bearing member at a first position to apply the urging force to the driven roller, and
wherein the second arm portion of the arm member contacts the bearing member at a second position different from the first position to apply the force to the driven roller.

15. An image forming apparatus configured to form an image on a sheet, the image forming apparatus comprising:
an endless belt;
a driving roller which is configured to rotationally drive the belt;
a driven roller which is configured to be rotationally driven with the rotation of the belt, wherein the belt has an extension surface defined by a flat region between the driving roller and the driven roller;
a frame which supports the driving roller and the driven roller;
a bearing member which is provided to the frame to be displacable, and rotatably supports the driven roller;
a tension generating member including a spring which is configured to generate an urging force to generate a tension at the belt;
a displacement member which is provided to be displacable in a displacement direction parallel to an axial direction of the driven roller, and which is displaced in the displacement direction together with the belt when the belt is moved in a moving direction along the displacement direction during the rotation of the belt; and
an axial force converting unit which is configured to convert a force of displacing the displacement member into a force which is directed in a direction intersecting the displacement direction and predominately parallel to the extension surface which causes the tension generated at the belt to change such that a ratio of a tension generated on a trailing side in the moving direction of the belt to a tension generated on a leading side in the moving direction of the belt is decreased,
wherein the axial force converting unit includes an arm member including:
a first arm portion configured to receive a force parallel to the axial direction of the driven roller from the displacement member; and
a second arm portion which extends in a direction intersecting an extending direction of the first arm portion, and which is configured to apply a force to the driven roller,
wherein the arm member is swingably provided to the frame,
wherein the spring of the tension generating member contacts the bearing member at a first position to apply the urging force to the driven roller, and
wherein the second arm portion of the arm member contacts the bearing member at a second position different from the first position to apply the force to the driven roller.

* * * * *

UNITED STATES PATENT AND TRADEMARK OFFICE
CERTIFICATE OF CORRECTION

PATENT NO. : 8,702,097 B2  
APPLICATION NO. : 12/724933  
DATED : April 22, 2014  
INVENTOR(S) : Wataru Yamaguchi Page 1 of 1

It is certified that error appears in the above-identified patent and that said Letters Patent is hereby corrected as shown below:

In the claims

Column 15, Claim 1, Line 48:
  Please delete "displacable" and replace with --displaceable--

Column 15, Claim 1, Lines 52-53:
  Please delete "displacable" and replace with --displaceable--

Column 16, Claim 2, Line 22:
  Please delete "displacable" and replace with --displaceable--

Column 17, Claim 14, Line 28:
  Please delete "displacable" and replace with --displaceable--

Column 17, Claim 14, Lines 32-33:
  Please delete "displacable" and replace with --displaceable--

Column 18, Claim 15, Line 20:
  Please delete "displacable" and replace with --displaceable--

Column 18, Claim 15, Lines 24-25:
  Please delete "displacable" and replace with --displaceable--

Signed and Sealed this
Twenty-fourth Day of November, 2015

Michelle K. Lee
*Director of the United States Patent and Trademark Office*